United States Patent
Otsuka

(10) Patent No.: US 12,101,561 B2
(45) Date of Patent: Sep. 24, 2024

(54) IMAGE DISPLAY SYSTEM, IMAGE PROCESSING DEVICE, AND IMAGE DISPLAY METHOD

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 110 days.

(21) Appl. No.: 17/913,485

(22) PCT Filed: Mar. 30, 2020

(86) PCT No.: PCT/JP2020/014619
§ 371 (c)(1),
(2) Date: Sep. 22, 2022

(87) PCT Pub. No.: WO2021/199184
PCT Pub. Date: Oct. 7, 2021

(65) Prior Publication Data
US 2023/0139216 A1    May 4, 2023

(51) Int. Cl.
*H04N 23/698* (2023.01)
*G02B 27/01* (2006.01)
*G06F 3/01* (2006.01)
*G06T 7/70* (2017.01)

(52) U.S. Cl.
CPC ....... *H04N 23/698* (2023.01); *G02B 27/0172* (2013.01); *G06F 3/013* (2013.01); *G06T 7/70* (2017.01); *G06T 2207/20132* (2013.01)

(58) Field of Classification Search
None
See application file for complete search history.

(56) References Cited

U.S. PATENT DOCUMENTS

| | | |
|---|---|---|
| 10,133,073 B2 | 11/2018 | Oto |
| 10,356,219 B2 | 7/2019 | Ota |
| 10,482,568 B2 | 11/2019 | Kasai |
| 10,701,184 B2 | 6/2020 | Miyazaki |
| 10,871,822 B2 | 12/2020 | Nakata |
| 10,957,104 B2 | 3/2021 | Ishida |

(Continued)

FOREIGN PATENT DOCUMENTS

| | | |
|---|---|---|
| JP | 5324799 A | 12/1993 |
| JP | 2008219156 A | 9/2008 |

(Continued)

OTHER PUBLICATIONS

Machine Translation for JP2012-33038 (Year: 2012).*

(Continued)

*Primary Examiner* — Dave Czekaj
*Assistant Examiner* — Shanika M Brumfield
(74) *Attorney, Agent, or Firm* — Matthew B. Dernier, Esq.

(57) ABSTRACT

A server transfers a wide field-of-view image having a field of view wider than the display field of view of a client by multicast streaming or the like. Image processing devices of clients crop regions corresponding to the display fields of view of head-mounted displays and flat panel displays connected to the respective image processing devices to form images compatible with the respective formats and then output the images.

26 Claims, 11 Drawing Sheets

(56) References Cited

U.S. PATENT DOCUMENTS

| | | | |
|---|---|---|---|
| 10,969,591 B2 | 4/2021 | Nakamura | |
| 11,094,097 B2 | 8/2021 | Ishikawa | |
| 11,119,319 B2 | 9/2021 | Yokota | |
| 2012/0194636 A1* | 8/2012 | Tokunaga | H04N 23/698 348/E7.091 |
| 2013/0050394 A1* | 2/2013 | Zhou | H04N 23/90 348/14.02 |
| 2015/0363976 A1* | 12/2015 | Henson | H04N 13/279 345/419 |
| 2016/0180496 A1 | 6/2016 | Kasai | |
| 2016/0282619 A1 | 9/2016 | Oto | |
| 2017/0019504 A1 | 1/2017 | Ota | |
| 2019/0057542 A1* | 2/2019 | Bronder | G06T 5/80 |
| 2019/0149636 A1 | 5/2019 | Miyazaki | |
| 2019/0253743 A1 | 8/2019 | Tanaka | |
| 2019/0317595 A1 | 10/2019 | Nakata | |
| 2020/0090403 A1 | 3/2020 | Ishida | |
| 2020/0132996 A1 | 4/2020 | Yokota | |
| 2020/0219300 A1 | 7/2020 | Ishikawa | |
| 2020/0319463 A1 | 10/2020 | Nakamura | |
| 2021/0174768 A1* | 6/2021 | Jarvenpaa | G06T 3/04 |

FOREIGN PATENT DOCUMENTS

| | | |
|---|---|---|
| JP | 2012033038 A | 2/2012 |
| JP | 2018166279 A | 10/2018 |
| WO | 2015068656 A1 | 5/2015 |
| WO | 2015122052 A1 | 8/2015 |
| WO | 2015182189 A1 | 12/2015 |
| WO | 2017163720 A1 | 9/2017 |
| WO | 2017199859 A1 | 11/2017 |
| WO | 2017208957 A1 | 12/2017 |
| WO | 2017221784 A1 | 12/2017 |
| WO | 2018079166 A1 | 5/2018 |
| WO | 2019013016 A1 | 1/2019 |
| WO | 2019026765 A1 | 2/2019 |
| WO | 2019116994 A1 | 6/2019 |

OTHER PUBLICATIONS

Machine Translation for WO2015182189 (Year: 2015).*
Machine Translation for WO2017208957 (Year: 2017).*
International Search Report for corresponding PCT Application No. PCT/JP2020/014619, 6 pages, dated Sep. 1, 2020.
Notice of Reasons for Refusal for corresponding JP Application No. 2022-512924, 18 pages, dated Nov. 27, 2023.

* cited by examiner

F I G. 1
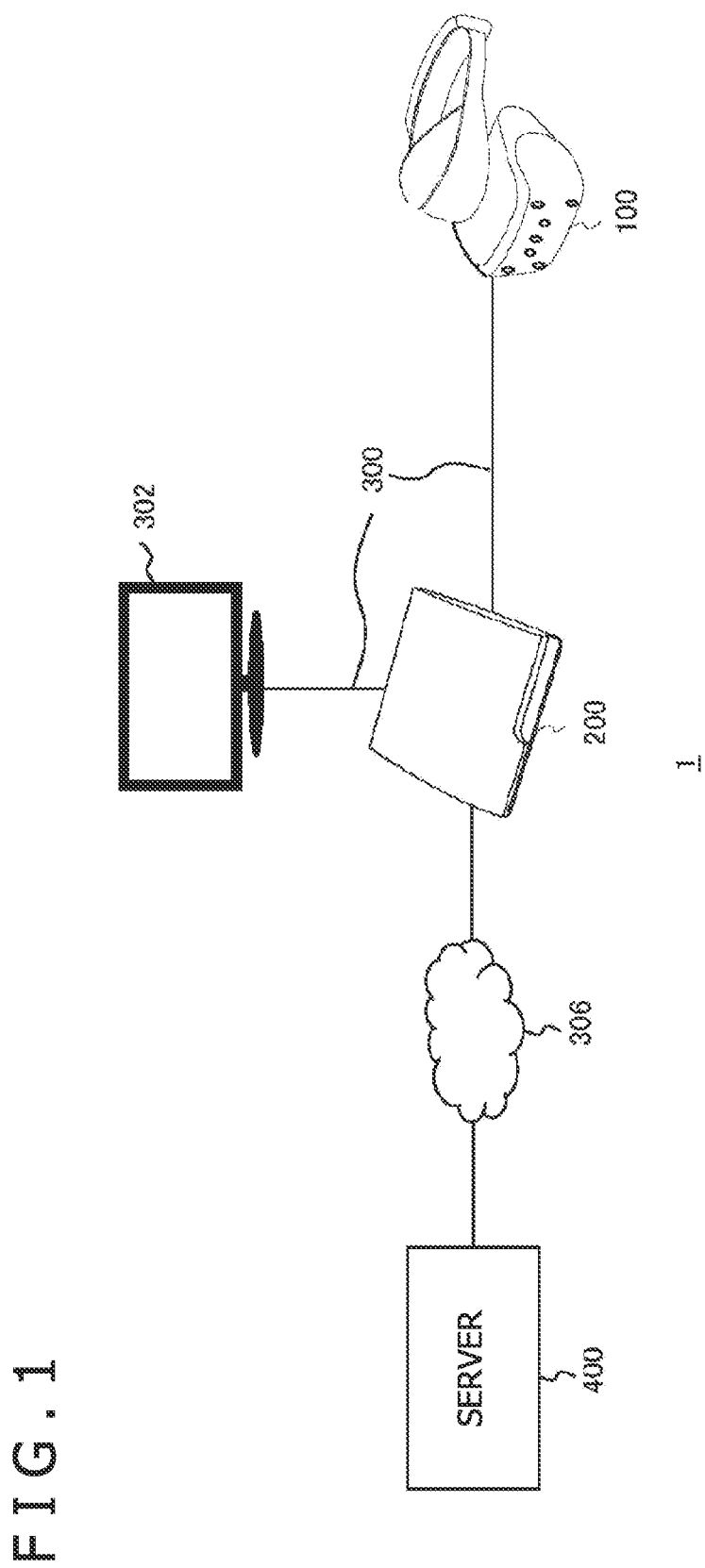

FIG.5
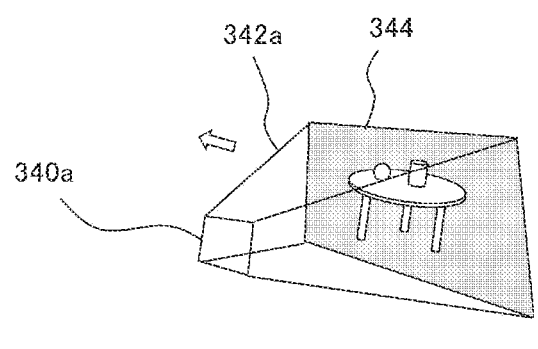 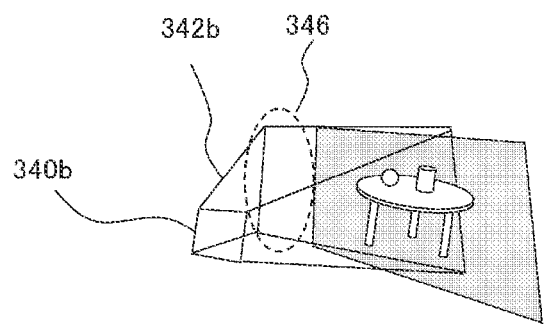
(a) (b)

(a)          (b)

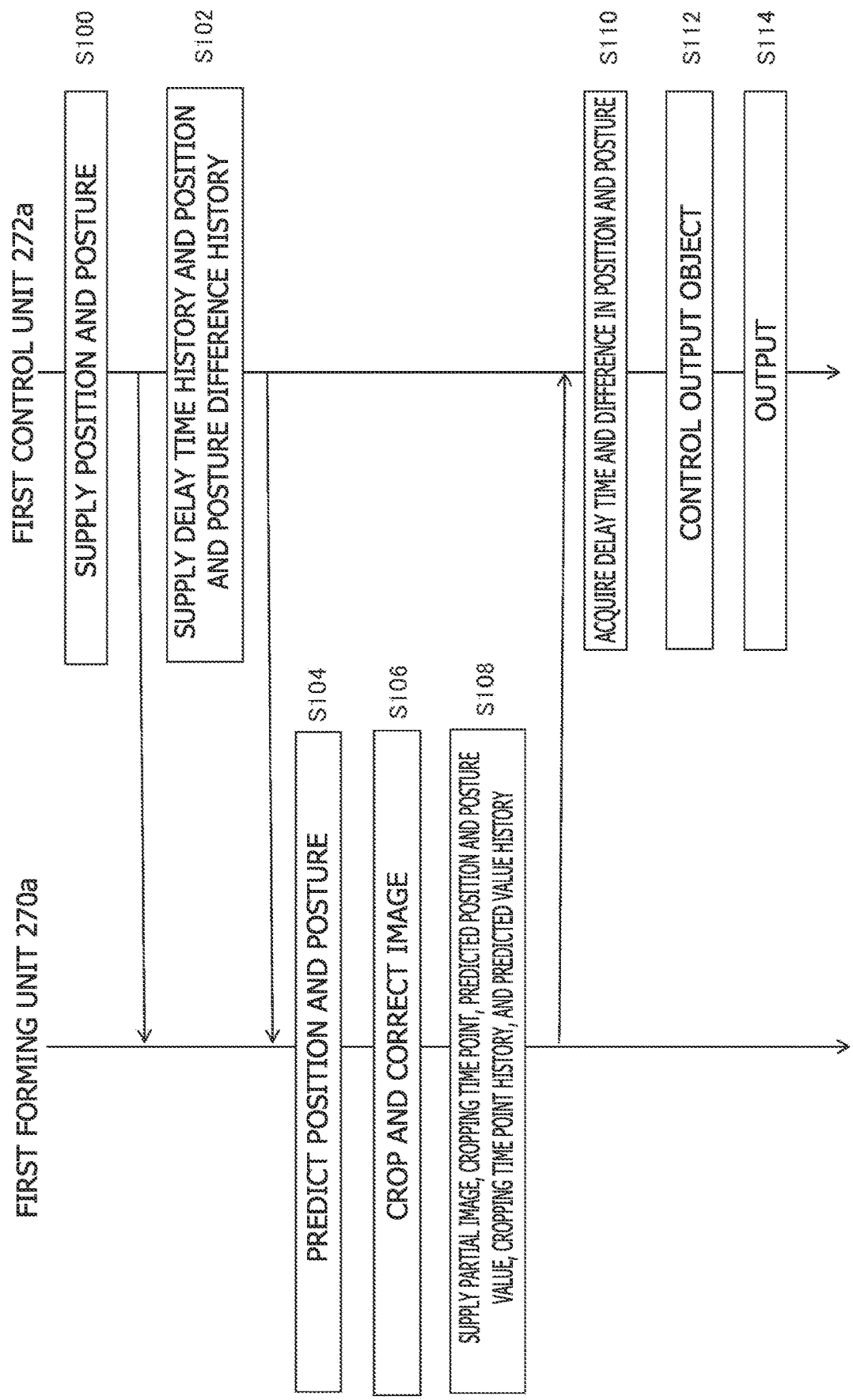

IMAGE DISPLAY SYSTEM, IMAGE PROCESSING DEVICE, AND IMAGE DISPLAY METHOD

TECHNICAL FIELD

The present invention relates to an image display system, an image processing device, and an image processing method that process data on a moving image serving as a display object.

BACKGROUND ART

According to improvements in information processing technology and image display technology in recent years, an experience of a video world in various forms has been enabled. For example, displaying a panoramic video on a head-mounted display to display an image corresponding to a line of sight of a user makes it possible to enhance a sense of immersion into a video world or to improve the operability of an application such as a game. Further, displaying image data transferred from a server having abundant resources by streaming allows users to enjoy a high-definition moving image or a game screen, regardless of a location or a scale.

SUMMARY

Technical Problem

Technologies that cause a client terminal to instantly display image data transmitted via a network may have the problem of a delay time due to communication between the client terminal and a server. For example, in a case where user operation is reflected in a display image on a client terminal side, data exchanges such as transmission of user operation to a server and transmission of image data from the server to the client terminal are required, with the result that a delay time that is not inconsiderable may occur. In a case where a head-mounted display is a display destination, it is conceivable that display is delayed from a motion of the head of a user, so that a sense of presence is degraded or visually induced motion sickness is caused. This problem tends to become more apparent in pursuing a higher image quality.

The present invention has been made in view of such a problem and has an object to provide a technology that can achieve both high image quality and reduction in delay time in image display associated with data transmission by communication.

Solution to Problem

In order to solve the problem described above, a certain aspect of the present invention relates to an image display system. The image display system includes an image data transferring device configured to transfer data on a moving image, and a client terminal configured to receive the data on the moving image and cause a display device to display the moving image, in which the image data transferring device includes an image generating unit configured to generate a frame of the moving image depicting a world serving as a display object in a field of view wider than a display field of view of a transfer destination, and a communication unit configured to transfer data on the frame to the client terminal by streaming, and the client terminal includes an image data acquiring unit configured to acquire the data on the frame, an image processing unit configured to crop a region in the display field of view from the frame, and a display control unit configured to output data on the region cropped to a display panel.

Another aspect of the present invention relates to an image processing device. The image processing device includes an image data acquiring unit configured to acquire data on a frame of a moving image depicting a world serving as a display object in a field of view wider than a display field of view, an image processing unit configured to crop a region in the display field of view from the frame, and a display control unit configured to output data on the region cropped to a display panel.

Still another aspect of the present invention relates to an image display method. The image display method is for an image display system, and the image display system includes an image data transferring device configured to transfer data on a moving image, and a client terminal configured to receive the data on the moving image and cause a display device to display the moving image. The image display method includes a step of generating, by the image data transferring device, a frame of the moving image depicting a world serving as a display object in a field of view wider than a display field of view of a transfer destination, a step of transferring, by the image data transferring device, data on the frame to the client terminal by streaming, a step of acquiring, by the client terminal, the data on the frame, a step of cropping, by the client terminal, a region in the display field of view from the frame, and a step of outputting, by the client terminal, data on the region cropped to a display panel.

Note that any combinations of the foregoing components and any conversions of the expressions of the present invention from/into methods, devices, systems, computer programs, data structures, recording media, and the like are also intended to constitute applicable aspects of the present invention.

Advantageous Effect of Invention

According to the present invention, it is possible to achieve both high image quality and reduction in delay time in image display associated with data transmission by communication.

BRIEF DESCRIPTION OF DRAWINGS

FIG. 1 is a diagram illustrating a configuration example of an image display system according to the present embodiment.

FIG. 5 depicts diagrams illustrating correction processing of an image that can be used for display on the head-mounted display in the present embodiment.

FIG. 13 is a flowchart illustrating the procedures of processing that the first forming unit of the image processing unit and the first control unit of the display control unit carry out in the image processing device of the present embodiment.

DESCRIPTION OF EMBODIMENT

Figure 2:
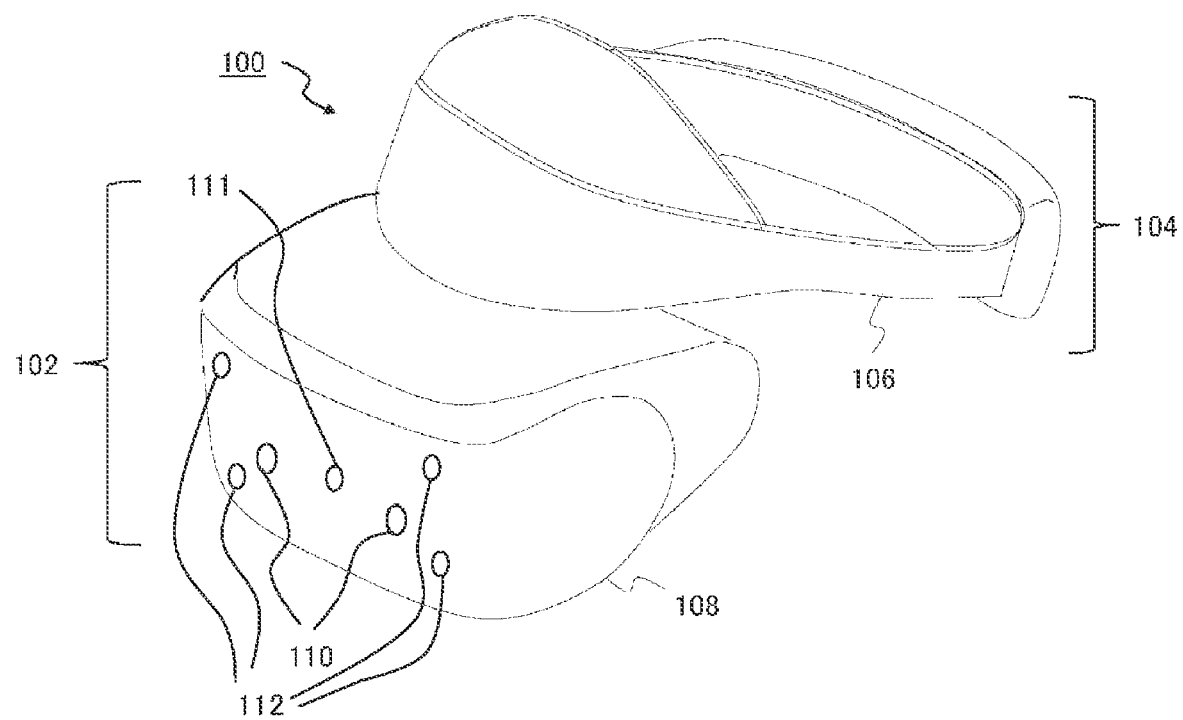
FIG. 2 is a diagram illustrating an appearance example of a head-mounted display of the present embodiment.

FIG. 1 illustrates a configuration example of an image display system according to the present embodiment. An image display system 1 includes an image processing device 200 serving as a client terminal, a head-mounted display 100, a flat panel display 302, and a server 400. The image processing device 200 is connected to the head-mounted display 100 and the flat panel display 302 via an interface 300 such as wireless communication, a USB (Universal Serial Bus) Type-C, or an HDMI (High-Definition Multimedia Interface) (registered trademark). The image processing device 200 is further connected to the server 400 via a network 306 such as the internet or a LAN (Local Area Network).

The server 400 as an image data transferring device generates at least a portion of an image serving as a display object and transfers the image to the image processing device 200 by streaming. Here, the server 400 may be a server of a company or the like that provides various delivery services such as cloud games or a home server configured to transmit data to any terminal. Thus, the network 306 may be the Internet or other public networks, a LAN (Local Area Network), or the like and have any scale. For example, the network 306 may be a cell phone carrier network or a network via Wi-Fi spots in cities or Wi-Fi access points at home. Alternatively, the image processing device 200 and the server 400 may be directly connected to each other through a video interface.

The image processing device 200 converts image data transmitted from the server 400 into a format suitable for the head-mounted display 100 or the flat panel display 302 as needed and then outputs the image data to the head-mounted display 100 or the flat panel display 302 at appropriate timing. For example, the image processing device 200 generates an image in a field of view corresponding to the motion of the head of a user wearing the head-mounted display 100 and outputs the image to the head-mounted display 100. At this time, the image processing device 200 may also cause the flat panel display 302 to display an image in a similar field of view, thereby allowing other people to view the image that the user wearing the head-mounted display 100 is viewing.

However, the image processing device 200 may cause the head-mounted display 100 and the flat panel display 302 to display images in fields of view independent of each other. Further, the image processing device 200 may combine an image transmitted from the server 400 with a separately prepared UI (User Interface) plain image (also referred to as an "OSD (On Screen Display) plain image")) or with an image captured by a camera of the head-mounted display 100 and output the resultant to the head-mounted display 100 or the flat panel display 302.

With this configuration, a cloud game system that a plurality of users join can be implemented. However, the content of a moving image serving as a display object and a display destination thereof are not particularly limited in the present embodiment. For example, the server 400 may stream, as a display object, an image captured by a camera, which is not illustrated, to the image processing device 200 in real time.

Further, a configuration of a system to which the present embodiment is applicable is not limited to the one illustrated in FIG. 1. For example, one of the head-mounted display 100 and the flat panel display 302 or the plurality of head-mounted displays 100 may be connected to the image processing device 200 as display devices. Further, the image processing device 200 may be incorporated in the head-mounted display 100 or the flat panel display 302. For example, the flat panel display and the image processing device may be adopted in a personal computer or a mobile terminal (a handheld game console, a high-performance cell phone, or a tablet terminal) integrally including them.

At least any of the head-mounted display 100 and the flat panel display 302 may further be connected to those devices as needed. An input device, which is not illustrated, may be incorporated in or connected to the image processing device 200 or those terminals. Further, the number of the image processing devices 200 to be connected to the server 400 is not limited either.

FIG. 2 illustrates an appearance example of the head-mounted display 100. In the present example, the head-mounted display 100 includes an output mechanism section 102 and a mounting mechanism section 104. The mounting mechanism section 104 includes a mounting band 106 that goes, when the mounting mechanism section 104 is worn by the user, around the head of the user to fix the device. The output mechanism section 102 includes a housing 108 with a shape that covers the left and right eyes of the user wearing the head-mounted display 100 and accommodates a display panel that faces the eyes of the user wearing the head-mounted display 100.

The housing 108 further accommodates eyepieces that are located between the display panel and the eyes of the user wearing the head-mounted display 100 and allows the user to see an enlarged image. Further, the head-mounted display 100 may further include speakers or earphones at locations corresponding to the ears of the user wearing the head-mounted display 100.

The head-mounted display 100 further includes a stereo camera 110 on the front surface of the housing 108, a monocular camera 111 of a wide viewing angle at the center of the front surface, and four cameras 112 of a wide viewing angle at the four corners, namely, the upper left, the upper right, the lower left, and the lower right corners of the front surface. The head-mounted display 100 captures the moving image of an actual space in a direction corresponding to the orientation of the face of the user. In a certain aspect, the head-mounted display 100 provides a see-through mode in which the head-mounted display 100 immediately displays a moving image captured by the stereo camera 110 to allow the user to see the actual space in a direction in which the user faces as it is.

Further, at least any of images captured by the stereo camera 110, the monocular camera 111, and the four cameras 112 may be used to generate a display image. For example, the position and posture of the head-mounted display 100, namely, the head of the user relative to a surrounding space may be acquired by SLAM (Simultaneous Localization and Mapping) at a predetermined rate to be used for image field of view determination or image correction. Alternatively, the image processing device 200 may combine an image transmitted from the server 400 with a captured image to generate a display image.

Further, the head-mounted display 100 may accommodate any of motion sensors for deriving the position, the posture, and the motion of the head-mounted display 100, such as an acceleration sensor, a gyroscope, and a geomagnetic sensor. In this case, the image processing device 200 acquires, on the basis of a measurement value from the motion sensor, information regarding the position and posture of the head of the user at a predetermined rate. The information can be used to determine the field of view of an image or correct an image.

Figure 3:
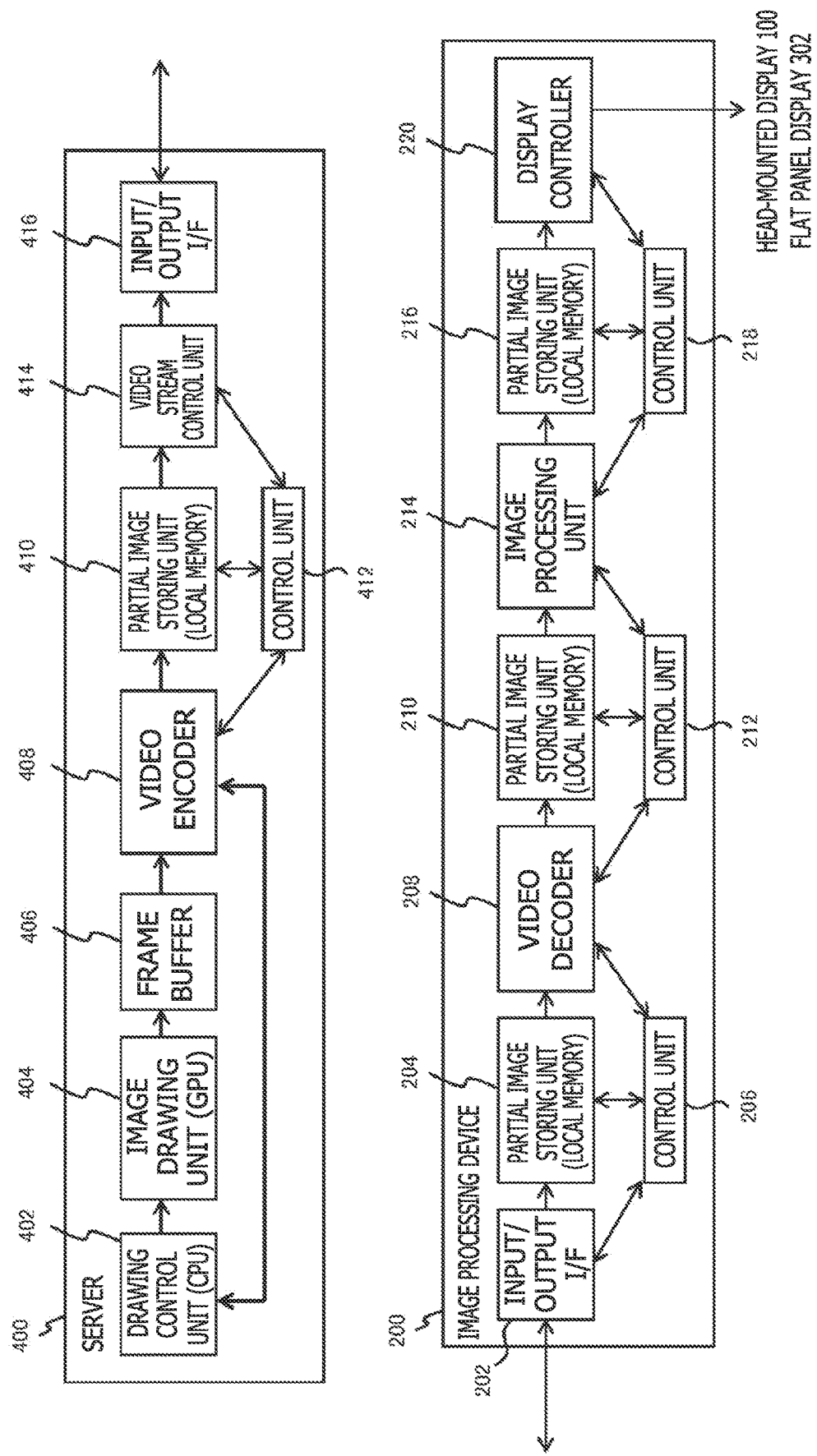
FIG. 3 is a diagram illustrating basic configurations of a server and an image processing device according to the present embodiment.

FIG. 3 illustrates the basic configurations of the server 400 and the image processing device 200 according to the present embodiment. The server 400 and the image processing device 200 according to the present embodiment include, in place, local memories configured to store a partial image smaller than one frame of a display image. Then, the compression/encoding and transmission of image data in the server 400 and the reception, decoding/decompression, various types of image processing, and output to the display device of data in the image processing device 200 are performed in units of the partial image as pipeline processing. With this, a delay time from image drawing in the server 400 to display on the display device connected to the image processing device 200 is reduced.

In the server 400, a drawing control unit 402 is implemented by a CPU (Central Processing Unit) and controls image drawing in an image drawing unit 404. As described above, the content of an image to be displayed is not particularly limited in the present embodiment, but, for example, the drawing control unit 402 causes a cloud game to progress and controls the image drawing unit 404 to draw a frame of a moving image depicting the resultant.

The image drawing unit 404 is implemented by a GPU (Graphics Processing Unit). The image drawing unit 404 draws a frame of a moving image at a predetermined or variable rate under the control of the drawing control unit 402 and stores the resultant in a frame buffer 406. The frame buffer 406 is implemented by a RAM (Random Access Memory). A video encoder 408 compresses/encodes, under the control of the drawing control unit 402, image data stored in the frame buffer 406 in units of a partial image smaller than one frame. A partial image is an image in each region obtained by dividing the image plane of a frame at boundaries set horizontally, vertically, bidirectionally, or diagonally, for example.

On this occasion, the video encoder 408 may start, as soon as an image necessary for compression/encoding is drawn by the image drawing unit 404, the compression/encoding of the frame without waiting for a vertical synchronization signal from the server. According to the related art in which various types of processing such as frame drawing and compression/encoding are performed in synchronization with a vertical synchronization signal serving as a reference, times taken for respective processes between image drawing and image display are matched with each other in units of a frame to easily manage the order of frames. In this case, however, even when drawing processing of a frame ends early due to the content thereof, compression/encoding processing cannot start until the next vertical synchronization signal arrives. In the present embodiment, as described later, the generation time point of a partial image is managed in units of a partial image to prevent a useless wait time.

The encoding standard that the video encoder 408 uses for compression/encoding may be a general standard such as H.264/AVC (Advanced Video Coding) or H.265/HEVC (High Efficiency Video Coding). The video encoder 408 stores the compressed/encoded image data in a partial image storing unit 410. The partial image storing unit 410 is a local memory implemented by an SRAM (Static Random Access Memory) or the like and has a storage area corresponding to the data size of a partial image smaller than one frame. The same holds true for a "partial image storing unit" described later. A video stream control unit 414 reads, every time compressed/encoded partial image data is stored in the partial image storing unit 410, the data and packetizes the data with audio data or control information as needed.

A control unit 412 always monitors the status of data writing from the video encoder 408 to the partial image storing unit 410 or the status of data reading from the partial image storing unit 410 to the video stream control unit 414 and appropriately controls the operation of the video encoder 408 and the video stream control unit 414. For example, the control unit 412 performs control to prevent a data shortage, that is, a buffer underrun and a data overflow, that is, a buffer overrun from occurring in the partial image storing unit 410.

An input/output interface 416 establishes communication with the image processing device 200 and sequentially transmits data packetized by the video stream control unit 414 via the network 306. The input/output interface 416 may appropriately transmit audio data or the like other than image data. The input/output interface 416 may further acquire information regarding user operation from the image processing device 200 and supply the information to the drawing control unit 402.

In the image processing device 200, an input/output interface 202 sequentially acquires image or audio data transmitted from the server 400. The input/output interface 202 may further appropriately acquire information regarding user operation from, for example, the head-mounted display 100 or the input device, which is not illustrated, and may transmit the information to the server 400. The input/output interface 202 decodes the packet acquired from the server 400 and stores the extracted image data in a partial image storing unit 204.

The partial image storing unit 204 is a local memory provided between the input/output interface 202 and a video decoder 208. A control unit 206 always monitors the status of data writing from the input/output interface 202 to the partial image storing unit 204 or the status of data reading from the partial image storing unit 204 to the video decoder 208 and appropriately controls the operation of the input/output interface 202 and the video decoder 208.

The video decoder 208 reads, every time partial image data is stored in the partial image storing unit 204, the data, decodes/decompresses the data by an encoding standard-based procedure, and then sequentially stores the data in a partial image storing unit 210. The partial image storing unit 210 is a local memory provided between the video decoder 208 and an image processing unit 214. A control unit 212 always monitors the status of data writing from the video decoder 208 to the partial image storing unit 210 or the status of data reading from the partial image storing unit 210 to the image processing unit 214 and appropriately controls the operation of the video decoder 208 and the image processing unit 214.

The image processing unit 214 reads, every time decoded/decompressed partial image data is stored in the partial image storing unit 210, the data and performs processing necessary for display on the data. For example, the image processing unit 214 carries out, to allow the user wearing the head-mounted display 100 to visually recognize a distortion-free image through the eyepieces, correction processing of giving distortion opposite to distortion due to the eyepieces.

Alternatively, the image processing unit 214 may refer to a separately prepared UI plain image and combine (superimpose) the UI plain image with an image transmitted from the server 400. Further, the image processing unit 214 may combine an image captured by the camera of the head-mounted display 100 with an image transmitted from the server 400. The image processing unit 214 may also shape an image transmitted from the server 400 such that the image has a field of view corresponding to the position and posture of the head of the user at the time of processing. The image processing unit 214 may also perform suitable image processing in view of output to the flat panel display 302, such as super-resolution processing.

In any case, the image processing unit 214 performs processing in units of a partial image stored in the partial image storing unit 210 and sequentially stores the resultant in a partial image storing unit 216. The partial image storing unit 216 is a local memory provided between the image processing unit 214 and a display controller 220. A control unit 218 always monitors the status of data writing from the image processing unit 214 to the partial image storing unit 216 or the status of data reading from the partial image storing unit 216 to the display controller 220 and appropriately controls the operation of the image processing unit 214 and the display controller 220.

The display controller 220 reads, every time partial image data subjected to image processing is stored in the partial image storing unit 216, the data and outputs the data to the head-mounted display 100 or the flat panel display 302 at appropriate timing. Specifically, the display controller 220 outputs, at a timing matched with a vertical synchronization signal from each display, data on a partial image in the uppermost section of each frame and then sequentially outputs data on partial images from top to bottom.

Figure 4:
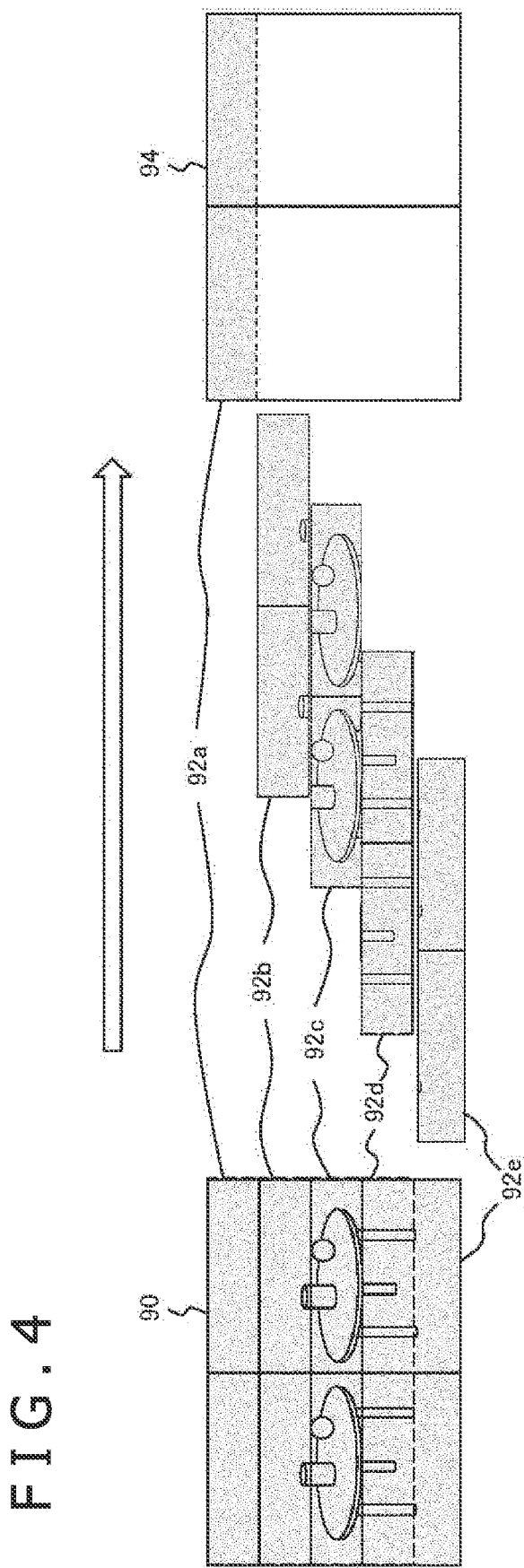
FIG. 4 is a diagram conceptionally illustrating processing of image drawing to image display according to the present embodiment.

Next, partial image pipeline processing that is implemented between image drawing and image display in the server 400 and the image processing device 200 is described. FIG. 4 conceptionally illustrates the processing of image drawing to image display according to the present embodiment. As described above, the server 400 generates a frame 90 of a moving image at a predetermined or variable rate. In the example illustrated in FIG. 4, the frame 90 has a configuration in which left-eye and right-eye images are represented in respective left and right equally divided regions, but the configuration of an image that the server 400 generates is not intended to be limited to this.

The server 400 compresses/encodes the frame 90 on a partial image-by-partial image basis as described above. In FIG. 4, the image plane is divided horizontally into five partial images 92*a*, 92*b*, 92*c*, 92*d*, and 92*e*. With this, the partial images are compressed/encoded one after another in this order and transmitted to the image processing device 200 to be displayed as indicated by the arrow. That is, while the partial image 92*a* in the uppermost section is being subjected to processing such as compression/encoding, transmission, decoding/decompression, and output to a display panel 94, the partial image 92*b* under the partial image 92*a*, the partial image 92*c* under the partial image 92*b*, and so on are sequentially transmitted to be displayed. With this, various types of processing that are required between image drawing and image display can be carried out in parallel so that an image can be displayed with a transfer time that causes the minimum delay.

Meanwhile, in a case where a moving image in a field of view corresponding to the position and posture of the head of the user wearing the head-mounted display 100 is generated, the following procedures are performed: the server 400 acquires information regarding the motion of the head from the image processing device 200 and generates and transfers an image in a field of view corresponding to the information, and the image processing device 200 causes the head-mounted display 100 to display the image. Due to the time required for those procedures, a display image has a delay that is not inconsiderable from the motion of the head, with the result that the sense of immersion into virtual reality may be degraded or that visually induced motion sickness may be caused, leading to a degradation in quality of user experience.

Accordingly, it is conceivable that the image processing device 200 corrects and matches an image generated once by the server 400 with the position and posture of the head immediately before display and then displays the image. FIG. 5 depicts diagrams illustrating correction processing of an image that can be used for display on the head-mounted display 100. First, (a) illustrates a situation where the server 400 has set a view screen 340*a* corresponding to acquired position and posture information. The server 400 draws, on the view screen 340*a*, an image 344 included in a frustum 342*a* defined by the view screen 340*a*.

It is assumed that, meanwhile, by the time at which the thus drawn image is displayed on the image processing device 200 side, the head has been slightly turned to the left from the position and posture grasped by the server 400 as indicated by the arrow. In this case, as illustrated in (b), the image processing device 200 sets a view screen 340*b* slightly shifted to the left from the view screen 340*a* and corrects the image to an image corresponding to the view screen 340*b*. With this, the head-mounted display 100 can display an image following the motion of the head, regardless of the transmission path of moving image data.

Meanwhile, such a technique has a risk in that the amount of correction is increased as the speed of the motion of a head is increased, resulting in a shortage of data necessary for display. In the example illustrated in FIG. 5, a frustum 342*b* newly set by the image processing device 200 has a large region 346 to which no data has been transmitted from the server 400 and it is thus difficult to make a correction. Accordingly, the server 400 of the present embodiment generates and transfers a moving image depicting a world serving as a display object in a field of view wider than the display field of view of the head-mounted display 100 or the like.

Then, the image processing device 200 crops a region in the display field of view from the transferred image in the wide field of view and outputs the resultant. In a case where the head-mounted display 100 is an output destination, the image processing device 200 crops an image in a region corresponding to the position and posture of the head-mounted display 100. Here, when the field of view of a moving image that the server 400 generates is set to cover all displayable orientations, an image following any motion and facing direction of the user can be displayed without any problem.

Further, also in an aspect in which a plurality of users view the same image world with independent fields of view, since it is sufficient that the server 400 generates and transfers a frame common to all the users, there is no need to perform the processing of generating images matched with the individual fields of view. Moreover, since multicast or broadcast is enabled, the bandwidth utilization efficiency of the delivery network can be enhanced.

Such a configuration is particularly effective in, for example, a game in which all users get on a single vehicle to move in a virtual world and an attraction in an amusement park in which a plurality of users simultaneously take part. In this case, the server 400 generates a 360° image that can visually be recognized from the positions of users and transfers the image to the image processing device 200 of each user. With this, the users can freely look around the world depicted in the image by using the head-mounted display 100 or the flat panel display 302.

Figure 6:
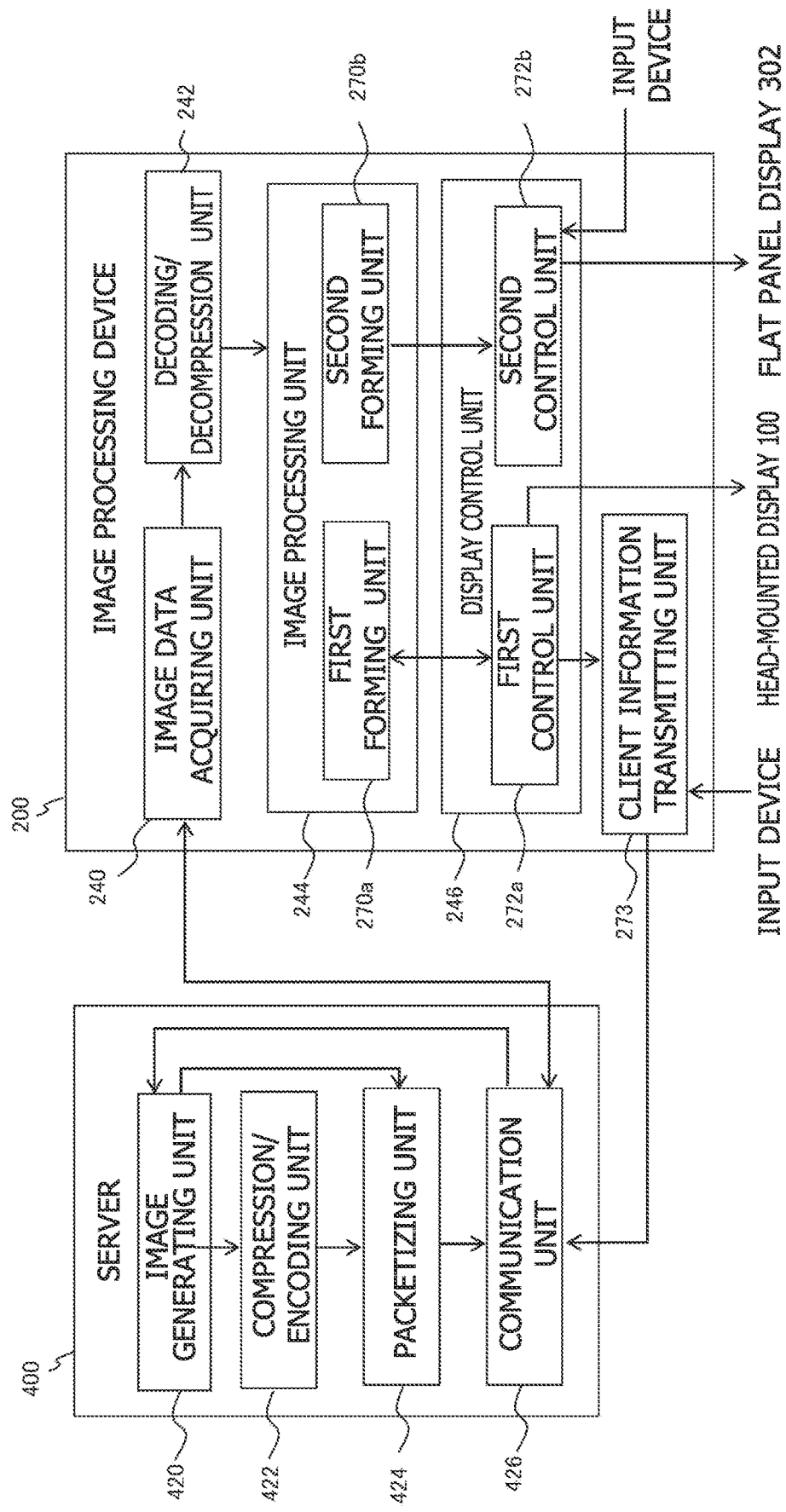
FIG. 6 is a diagram illustrating functional blocks of the server and the image processing device of the present embodiment.

FIG. 6 illustrates the functional blocks of the server 400 and the image processing device 200 of the present embodiment. Each functional block illustrated in FIG. 6 can be implemented by a CPU, a GPU, an encoder, a decoder, a calculator, various memories, or the like in terms of hardware, and can be implemented by a program that is loaded from a recording medium on a memory and provides various functions such as an information processing function, an image drawing function, a data input/output function, and a communication function in terms of software. Thus, it is to be understood by those skilled in the art that those functional blocks can be implemented in various forms including hardware only, software only, or a combination thereof and are not limited to any of them.

The server 400 includes an image generating unit 420, a compression/encoding unit 422, a packetizing unit 424, and a communication unit 426. The image generating unit 420 includes the drawing control unit 402, the image drawing unit 404, and the frame buffer 406 of FIG. 3 and generates a frame of a moving image to be transmitted to the image processing device 200, such as a game image, at a predetermined or variable rate. The image generating unit 420 dynamically generates a frame of a moving image to be transferred that has not existed so far, for example. Alternatively, the image generating unit 420 may acquire moving image data from a camera, which is not illustrated, for example.

In any case, as described above, the image generating unit 420 generates a frame of a moving image depicting a world serving as a display object in a field of view wider than the display field of view of a transfer destination. For example, the image generating unit 420 generates data on a generally called 360° image (omnidirectional image) in equirectangular projection. However, the image format is not limited, and any of various formats such as polyconic projection, equidistant projection, and other fisheye lens image representation may be used. Further, in a case where a fisheye lens image is used, the server 400 may generate a 360° image by use of images obtained by two lenses.

Further, the field of view of a frame that the image generating unit 420 generates has any range at least wider than the display field of view of a transfer destination. Thus, the image generating unit 420 may generate an image covering all acceptable display fields of view, such as a 360° image, or may acquire information regarding an actual display field of view from the image processing device 200 or the like and generate an image in a field of view obtained by extending the range by a predetermined amount. Further, in a case where a plurality of images with parallax are displayed as in the case of the head-mounted display 100, the image generating unit 420 may generate a plurality of images with corresponding parallax in different fields of view. A frame of a moving image that the image generating unit 420 generates is hereinafter referred to as a "wide field-of-view image."

The compression/encoding unit 422 includes the video encoder 408, the partial image storing unit 410, and the control unit 412 of FIG. 3 and compresses/encodes wide field-of-view image data generated by the image generating unit 420 in units of a partial image. Here, the compression/encoding unit 422 performs motion compensation and encoding in units of a region having a predetermined number of rows such as one row or two rows, or of a rectangular region in a predetermined size such as 16×16 pixels or 64×64 pixels. Thus, the compression/encoding unit 422 may start compression/encoding when data on a region corresponding to the minimum unit necessary for compression/encoding is generated by the image generating unit 420.

Note that a partial image that is a unit of pipeline processing including compression/encoding and transmission may be a region that is the same as or larger than the region of the minimum unit. The packetizing unit 424 includes the video stream control unit 414 and the control unit 412 of FIG. 3 and packetizes compressed/encoded partial image data in a format compatible with a communication protocol to be used. On this occasion, the packetizing unit 424 acquires the time point at which the partial image has been drawn (hereinafter referred to as "generation time point") from the image generating unit 420 or the compression/encoding unit 422 and associates the generation time point with the partial image data.

The communication unit 426 includes the input/output interface 416 of FIG. 3 and transmits a packet including compressed/encoded partial image data and the generation time point thereof to the image processing device 200. With those components, the server 400 performs compression/encoding, packetizing, and transmission in parallel in units of a partial image smaller than one frame as pipeline processing. Here, the communication unit 426 may deliver a single piece of wide field-of-view image data to the plurality of image processing devices 200 by streaming by a general multicast or broadcast technology. However, the number of the image processing devices 200 serving as transfer destinations is not limited.

The communication unit 426 may also acquire information regarding user operation from the image processing device 200 serving as a transfer destination. In this case, the image generating unit 420 may acquire information regarding user operation from the communication unit 426 and change, on the basis of the information, content that a frame to be generated depicts. For example, in a case where a game in which a plurality of users join the same virtual space as players is implemented, the image generating unit 420 generates each frame of a moving image so that objects in the virtual world move or the game progresses in response to user operation.

Note that "information regarding user operation" may include at least any piece of information including, other than user operation through the input device, the position and posture of the head of the user, and the point-of-gaze of the user that the head-mounted display 100 or the like acquires. At this time, the image generating unit 420 may generate each frame by referring to those pieces of information. In a case where a virtual point of view that the image generating unit 420 uses to generate a wide field-of-view image is changed depending on the status of the user, the communication unit 426 may also transmit information regarding the virtual point of view.

The image processing device 200 includes an image data acquiring unit 240, a decoding/decompression unit 242, an image processing unit 244, a display control unit 246, and a client information transmitting unit 273. Note that the decoding/decompression unit 242 and the image processing unit 244 have a common function in terms of performing predetermined processing on partial image data to generate data on a partial image for display, and at least any of them can also be collectively referred to as an "image processing unit." The image data acquiring unit 240 includes the input/output interface 202, the partial image storing unit 204, and the control unit 206 of FIG. 3 and acquires, from the server 400, compressed/encoded partial image data together with the generation time point thereof. The image data acquiring unit 240 also acquires, together with the image data, information regarding the virtual point of view used to generate the wide field-of-view image.

The decoding/decompression unit 242 includes the video decoder 208, the partial image storing unit 210, the control unit 206, and the control unit 212 of FIG. 3 and decodes/decompresses compressed/encoded partial image data. Here, the decoding/decompression unit 242 may start decoding/decompression processing when data on a region corresponding to the minimum unit necessary for compression/encoding such as motion compensation or encoding is acquired by the image data acquiring unit 240. The image processing unit 244 includes the image processing unit 214, the partial image storing unit 216, the control unit 212, and the control unit 218 of FIG. 3 and performs predetermined processing on partial image data to generate data on a partial image for display.

Specifically, the image processing unit 244 includes a first forming unit 270a and a second forming unit 27b each configured to form an image compatible with a display format that the connected display device implements. In the example illustrated in FIG. 6, the image processing device 200 to which the head-mounted display 100 and the flat panel display 302 are connected is assumed, and hence, the two forming units, namely, the first and second forming units corresponding to the respective displays are provided. As a matter of course, however, the same number of forming units as the number of display formats to be implemented may be provided.

That is, the image processing unit 244 has a function of generating, from a single wide field-of-view image transmitted from the server 400, a plurality of frames in different fields of view and formats, and the number of the frames depends on the number of display formats to be implemented. For example, when one of the head-mounted display 100 and the flat panel display 302 is connected to the image processing device 200 as a display device, it is sufficient that the image processing unit 244 only includes any one of the first forming unit 270a and the second forming unit 270b.

The first forming unit 270a and the second forming unit 270b each have a function of cropping, from a wide field-of-view image transmitted from the server 400, a region in a field of view that the connected display device displays. In a case where the head-mounted display 100 is a display destination, the first forming unit 270a crops a region in a field of view corresponding to the position and posture of the head-mounted display 100. In a case where the flat panel display 302 is a display destination, the second forming unit 270b crops, for example, a region in a field of view corresponding to user operation through the input device or the like.

However, a region to be cropped for display on the flat panel display 302 is not limited to this and may be a region corresponding to the field of view of the head-mounted display 100 as described above or a fixed region. Further, in a case where a wide field-of-view image transmitted from the server 400 is an image having the orientations as its axes such as an image in equirectangular projection or an image having lens distortion due to a fisheye lens or the like, the first forming unit 270a or the second forming unit 270b performs, simultaneously with or before or after crop processing, the processing of correcting the image to the format compatible with the display panel of the display destination.

For example, the first forming unit 270a or the second forming unit 270b converts an image in equirectangular projection into an orthographic image. In a case where the head-mounted display 100 is a display destination, the first forming unit 270a further crops left-eye and right-eye parallax images and then combines the left-eye and right-eye images to generate a display image. In a case where the server 400 transmits left-eye and right-eye wide field-of-view images, the first forming unit 270a may crop left-eye and right-eye images from the respective wide field-of-view images. The first forming unit 270a may also perform, on the left-eye and right-eye images, correction involving giving distortion opposite to distortion due to the eyepieces of the head-mounted display 100 or chromatic aberration correction. The first forming unit 270a or the second forming unit 270b proceeds those processes in units of a partial image in the order of data decoded/decompressed by the decoding/decompression unit 242.

Note that the image processing that the image processing unit 244 carries out is not limited to the one described above. For example, the image processing unit 244 may combine an image to be displayed together with a moving image, such as a UI plain image, in units of a partial image. Alternatively, the image processing unit 244 may perform gamma curve correction, tone curve correction, contrast enhancement, or the like. That is, the image processing unit 244 may perform, on the basis of the characteristics of the display device or user designation, necessary offset correction on the pixel value or the luminance value of decoded/decompressed image data. Further, the image processing unit 244 may perform noise removal processing of referring to neighboring pixels and performing processing such as superimposing, weighted average, or smoothing.

Further, the image processing unit 244 may match the resolution of image data with the resolution of the display panel or refer to neighboring pixels to perform bilinear or trilinear interpolation, weighted average, oversampling, or the like. Further, the image processing unit 244 may refer to neighboring pixels to determine the type of image texture and selectively perform the processing of denoising, edge enhancement, smoothing, or tone/gamma/contrast correction. At this time, the image processing unit 244 may perform the processing together with an image size upscaler or downscaler.

Further, the image processing unit 244 may perform format conversion in a case where the pixel format of image data and the pixel format of the display panel is different from each other. For example, the image processing unit 244 may perform conversion from YUV to RGB or from RGB to YUV, conversion between YUV444, YUV422, and YUV420, conversion between 8, 10, and 12-bit colors in RGB, or the like. Further, in a case where while decoded image data is in an HDR (High Dynamic Range) luminance range compatible format, the display only supports a narrow HDR luminance range (for example, a displayable luminance dynamic range is narrower than the HDR format standard), the image processing unit 244 may perform pseudo HDR processing (color space change) of converting, while keeping the HDR image features as much as possible, the image into an HDR luminance range format in the range supported by the display panel.

Further, in a case where decoded image data is in an HDR-compatible format but the display only supports SDR (Standard Dynamic Range), the image processing unit 244 may perform color space conversion into an SDR format while keeping the HDR image features as much as possible. In a case where decoded image data is in an SDR-compatible format but the display supports HDR, the image processing unit 244 may enhance and convert the image into an HDR format matched with the characteristics of the HDR panel as much as possible.

Further, in a case where the grayscale representation capability of the display is low, the image processing unit 244 may perform error diffusion addition or carry out dithering processing together with pixel format conversion. Further, in a case where decoded image data is lost or corrupted in part due to missing network transfer data or garbled bits, the image processing unit 244 may perform the processing of correcting the region. Further, the image processing unit 244 may perform one solid color filling, correction with neighboring pixel replication, correction with previous-frame neighboring pixels, or correction with pixels presumed from the periphery of a past frame or the current frame by adaptive loss correction.

Further, the image processing unit 244 may perform image compression to reduce the necessary bandwidth of the interface for outputting an image from the image processing device 200 to the display device. On this occasion, the image processing unit 244 may perform neighboring pixel-based lightweight entropy encoding, index value-based encoding, Huffman encoding, or the like. Further, in a case where the display device employs a liquid crystal panel, while it is possible to increase the resolution, a response time is long. In a case where the display device employs an organic EL (Electro-Luminescence) panel, while the response time is short, it is difficult to increase the resolution, and a phenomenon that color bleeding occurs between a black region and the periphery thereof, which is called Black Smearing, may occur.

Accordingly, the image processing unit 244 may perform correction to eliminate such various display panel-related adverse effects. For example, in the case of a liquid crystal panel, the image processing unit 244 inserts a black image between frames to reset the liquid crystal, thereby improving the response time. Further, in the case of an organic EL panel, the image processing unit 244 applies an offset to the luminance value or the gamma value for gamma correction, thereby making color bleeding due to Black Smearing inconspicuous.

The image processing unit 244 may perform, on an image, super-resolution processing of achieving an increase in definition or restoring or reconstructing a high-frequency component. At this time, the image processing unit 244 may input the image data to a database or network model constructed in advance by using machine learning or deep learning, to thereby convert the image. Here, the image processing unit 244 may carry out conversion in units of a partial image to achieve a reduction in delay. When the partial image unit at this time is matched with a partial image unit determined on the basis of the scanning order or division configuration of the display panel, the series of processes can be pipelined and a further reduction in delay can therefore be implemented.

The display control unit 246 includes the display controller 220 and the control unit 218 of FIG. 3 and controls the display panel of the head-mounted display 100 or the flat panel display 302 to sequentially display data on partial images for display. However, in the present embodiment, since pieces of compressed/encoded partial image data are individually acquired from the server 400, it is conceivable that, depending on the communication status, the acquisition order is changed, or the partial image data itself fails to be acquired due to packet loss.

Accordingly, the display control unit 246 derives elapsed times since partial images have been drawn from the generation time points of the respective partial images and then adjusts the output timing of the partial images to the display panel to reproduce the drawing timing in the server 400. Specifically, the display control unit 246 identifies, on the basis of the generation time points of partial image data and/or elapsed times from the generation time points, a data acquisition status including the original display order or display timing of the partial image data, the quantity of missing partial image data, and the like.

Then, depending on the data acquisition status, the display control unit 246 changes an object to be output to the display panel or appropriately adjusts the output order or the output timing. For example, the display control unit 246 determines, depending on the data acquisition status, whether to output data on an original partial image included in the next frame or to output data on a partial image included in the previous frame again. The display control unit 246 makes such an output object determination by the timing at which a vertical synchronization signal that is the start time point of the display of the next frame arrives.

For example, in a case where the ratio of missing partial images in a frame is equal to or more than a predetermined value, the display control unit 246 may change, depending on the quantity (ratio) of acquired partial images, an output object by replacing the output object by the previous frame data, for example. Further, the display control unit 246 may change an output object in the next frame display period depending on the output record of past frames or an elapsed time from a generation time point. Then, the display control unit 246 outputs, to the display panel, the partial image data determined as an output object in the determined order and timing.

When the image processing unit 244 includes the first forming unit 270a and the second forming unit 270b, the display control unit 246 may include a first control unit 272a and a second control unit 272b each having the above-mentioned function as illustrated in FIG. 6. The first control unit 272a outputs an image formed by the first forming unit 270a to the display panel of the head-mounted display 100, and the second control unit 272b outputs an image formed by the second forming unit 270b to the display panel of the flat panel display 302.

The client information transmitting unit 273 includes the input/output interface 202 of FIG. 3, or the like, acquires information regarding user operation and transmits the information to the server 400. As described above, information regarding user operation may be the position and posture of the head-mounted display 100, namely, the head of the user, the point of view of the user, or the content of operation different from field of view-related operation for a display image, such as a game command input through the input device. For information regarding the position and posture of the head of the user or the point of view of the user, data acquired by the first control unit 272a of the display control unit 246 as described later may be repurposed. The client information transmitting unit 273 may also appropriately acquire various types of information regarding the image processing device 200 side, which are required for the server 400 to generate a frame, and may transmit the information to the server 400.

Figure 7:
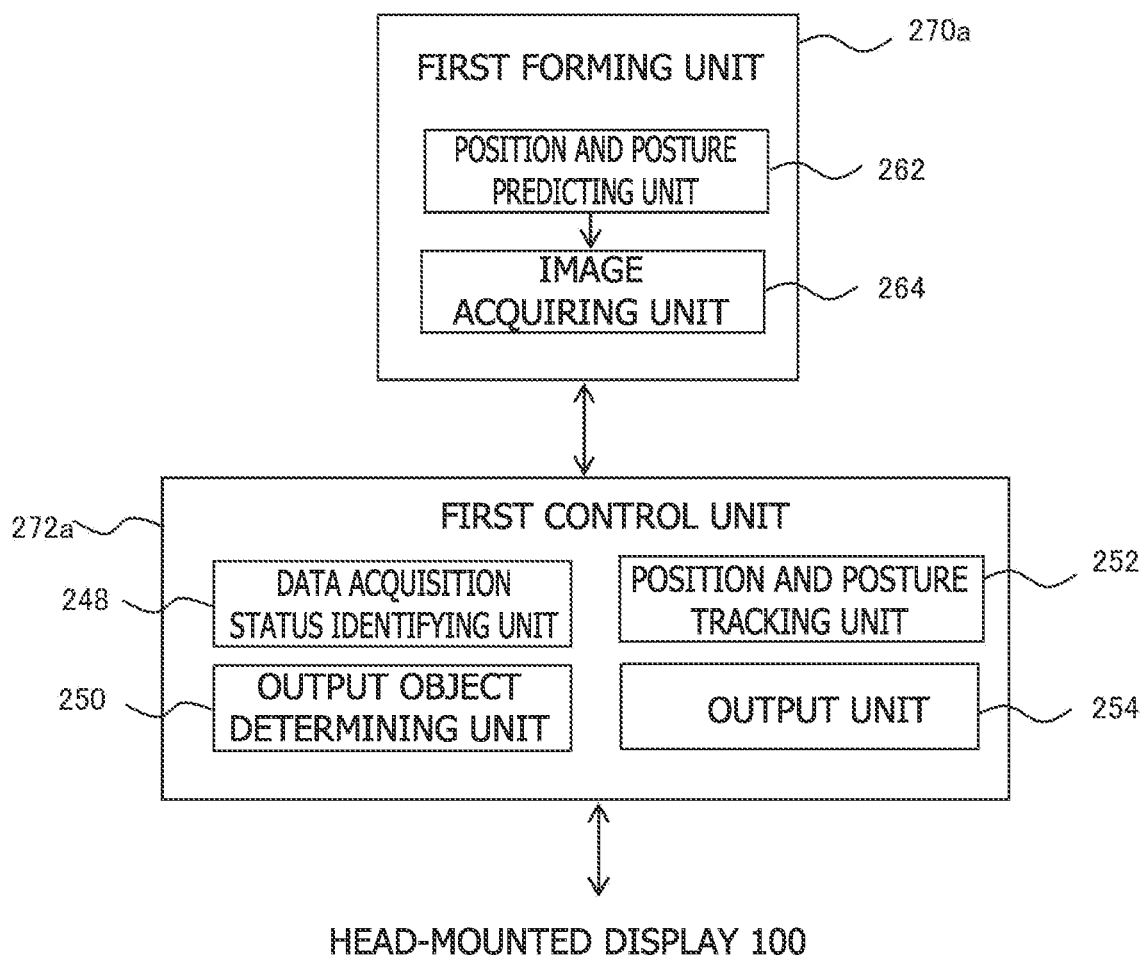
FIG. 7 is a diagram illustrating functional blocks of a first forming unit of an image processing unit and a first control unit of a display control unit of the image processing device of the present embodiment in more detail.

FIG. 7 illustrates the functional blocks of the first forming unit 270a of the image processing unit 244 and the first control unit 272a of the display control unit 246 of the image processing device 200 in more detail. As described above, the first forming unit 270a and the first control unit 272a process and output an image that the head-mounted display 100 displays. The first forming unit 270a includes a position and posture predicting unit 262 and an image acquiring unit 264.

The position and posture predicting unit 262 predicts the position and posture of the head-mounted display 100 at the time of the display of a target frame. That is, the position and posture predicting unit 262 predicts, on the basis of an actual change in position and posture obtained by then, the position and posture of the head-mounted display 100 at a future time point at which a target frame is to be displayed. The position and posture predicting unit 262 acquires an actual change in position and posture from the first control unit 272a. Then, the position and posture predicting unit 262 fits and extrapolates the temporal change to the estimated display time point of a target frame, to thereby predict position and posture at the time of display.

The image acquiring unit 264 crops, from a wide field-of-view image decoded/decompressed by the decoding/decompression unit 242, an image in a region corresponding to predicted position and posture. As conceptionally illustrated in FIG. 5, the image acquiring unit 264 sets a view screen corresponding to a predicted position and posture value and acquires an image in a region included in the frustum of the view screen. When an original wide field-of-view image is represented with its axes being the directions in equirectangular projection or the like or has distortion due to the photographing lens, the image acquiring unit 264 converts a cropped image into an orthographic image. On this occasion, the image acquiring unit 264 may refer to a displacement vector map using a displacement vector representing, on the image plane, a position in the orthographic image of each pixel in the region cropped from the wide field-of-view image, thereby performing cropping and image conversion at high speed.

In this case, the image acquiring unit 264 refers to the displacement vector map to acquire the pixel position of the displacement destination of each pixel of a partial image, thereby generating a cropped partial image. At this time, the area of a cropped image that can be generated from a pre-crop partial image may be different from that of the pre-crop partial image. The image acquiring unit 264 starts cropping processing referring to a displacement vector map at the time when data on a pre-crop partial image necessary for generating cropped partial image data is stored in the local memory on the preceding stage. With this, a cropped image can also be processed in units of a partial image.

The image acquiring unit 264 may further simultaneously carry out correction of giving distortion corresponding to the eyepieces of the head-mounted display 100. In this case, a displacement vector for each pixel in the displacement vector map is a vector obtained by combining a displacement vector for cropping and a displacement vector for distortion correction. Of those, the displacement vector for distortion correction is data unique to the eyepieces and independent of the motion of the user, or the like and can thus be created in advance.

The image acquiring unit 264 combines the thus prepared displacement vector for distortion correction with a displacement vector necessary for cropping to update the displacement vector map and then performs correction. With this, by displacing each pixel in a partial image once, image cropping and the correction of distortion due to the eyepieces can simultaneously be performed. Note that the second forming unit 270b configured to process an image to be output to the flat panel display 302 may also perform cropping using a displacement vector map.

The first control unit 272a changes an object to be output to the display panel on the basis of, in addition to an elapsed time from the generation time point of an image in the server 400 described above, a difference between the predicted value of the position and posture of the head-mounted display 100 determined when the first forming unit 270a crops the image and an actual position and posture immediately before display. Specifically, the first control unit 272a includes a position and posture tracking unit 252, a data acquisition status identifying unit 248, an output object determining unit 250, and an output unit 254.

The position and posture tracking unit 252 acquires an image captured by at least any of the respective cameras of the head-mounted display or a measurement value from the motion sensor incorporated in the head-mounted display 100, thereby deriving the position and posture of the head-mounted display 100, namely, the head of the user or the point of view of the user at a predetermined rate. In position and posture or point of view derivation, any of various techniques that have hitherto practically been used as described above may be used. Alternatively, those pieces of information may be derived inside the head-mounted display 100, and the position and posture tracking unit 252 may only acquire the information from the head-mounted display 100 at a predetermined rate. On this occasion, the position and posture tracking unit 252 also acquires the time point (timestamp) at which the captured image or the motion sensor measurement value on which the head position and posture information is based has been obtained.

The data acquisition status identifying unit 248 acquires, in addition to an elapsed time from the generation time point of an image in the server 400, a difference between a predicted position and posture value determined by the first forming unit 270a and actual position and posture at the time of processing acquired by the position and posture tracking unit 252. Then, the data acquisition status identifying unit 248 identifies a data acquisition status including the original display order and display timing of the partial image data, the quantity of missing partial image data, and the like. The output object determining unit 250 changes an object to be output to the display panel or appropriately adjusts the output order or the output timing on the basis of those results.

The output unit 254 outputs, to the display panel of the head-mounted display 100, partial image data determined as an output object in order and timing determined by the output object determining unit 250. Note that the second control unit 272b configured to process an image to be output to the flat panel display 302 may also make output object determination and output order adjustment using an elapsed time from the generation time point of an image in the server 400.

Figure 8:
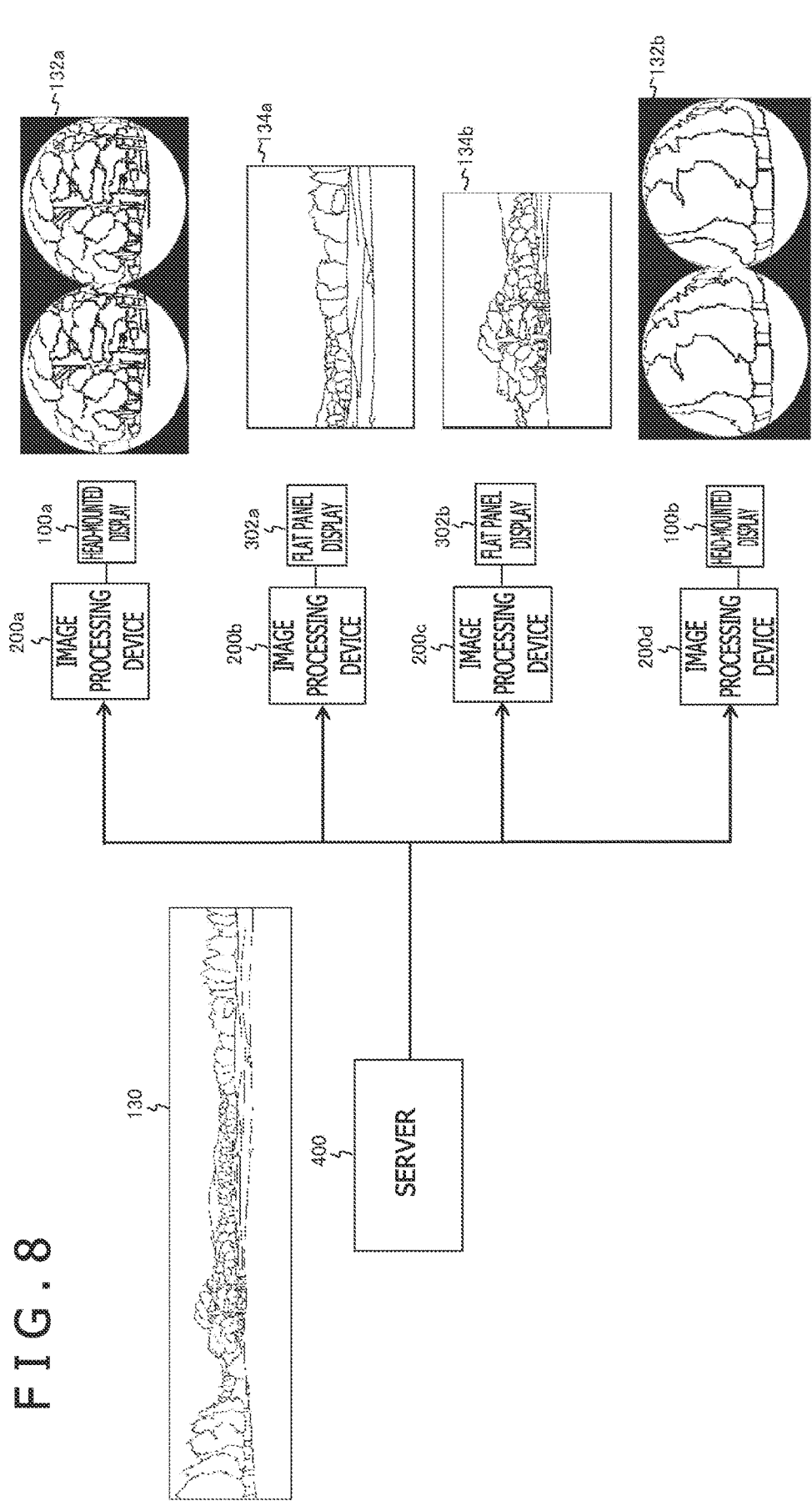
FIG. 8 is a diagram exemplifying an image format transition that can be implemented in the present embodiment.

FIG. 8 exemplifies an image format transition that can be implemented in the present embodiment. In the example illustrated in FIG. 8, four image processing devices 200*a*, 200*b*, 200*c*, and 200*d* are connected to the server 400, and a head-mounted display 100*a*, a flat panel display 302*a*, a flat panel display 302*b*, and a head-mounted display 100*b* are connected to the respective image processing devices. Here, images 132*a* and 132*b* to be displayed on the head-mounted displays 100*a* and 100*b* each include left-eye and right-eye images in a format with distortion due to the eyepieces.

However, when the viewing angle of the head-mounted display 100*a* and the viewing angle of the head-mounted display 100*b* are different from each other and are 100° and 150°, respectively, for example, the angles of view of the images 132*a* and 132*b* to be displayed on the respective head-mounted displays are also different from each other. Meanwhile, images 134*a* and 134*b* to be displayed on the flat panel displays 302*a* and 302*b* are each a single both-eye image in a general image format without lens distortion or the like. However, when the screen aspect ratio of the flat panel display 302*a* and the screen aspect ratio of the flat panel display 302*b* are different from each other and are 16:9 and 4:3, respectively, for example, the aspect ratios of the images 134*a* and 134*b* are also different from each other.

In the present embodiment, the server 400 transmits a wide field-of-view image 130 such as a 360° image to the image processing devices 200*a* to 200*d* in common. Then, the individual image processing devices 200*a* to 200*d* form display images compatible with the various display formats implemented by the respective image processing devices as described above. With this, as illustrated in FIG. 8, various angles of view, viewing angles, screen aspect ratios, or the like can be supported only by the uniform processing on the server 400 side. Moreover, since multicast or broadcast transfer can be performed, a load on the transfer bandwidth or the processing of the server 400 is not increased even when there are various display formats, individual users facing different directions, and an increase in number of users.

To crop an image from the wide field-of-view image 130 and correct the image to generate an appropriate display image in this way, the image processing devices 200*a* to 200*d* acquire information regarding a virtual point of view set when the server 400 has generated the wide field-of-view image 130, that is, information indicating which position and direction the wide field-of-view image 130 has as its center. In a case where a fixed virtual point of view is used, it is sufficient that virtual point of view information is shared between the server 400 and the image processing device 200 as initial processing. In a case where a variable virtual point of view is used, information regarding a virtual point of view in each frame is shared between the server 400 and the image processing device 200 whenever necessary as follows, for example. Note that, here, virtual point of view information may be the position and posture of the head of the user that determines a point of view, a point of view, the position of the origin in the three-dimensional space of a display object in a wide field-of-view image (field of view reference point), or the like.

That is, in a case where the server 400 generates a frame on the basis of the position and posture or point of view of the user in the image processing device 200*a*, 200*b*, 200*c*, or 200*d*, the server 400 first acquires, from the image processing device 200*a*, 200*b*, 200*c*, or 200*d*, information regarding the position and posture or point of view of the user and a timestamp indicating the time point at which the state has been established. Then, the server 400 transmits, together with the frame data, the information regarding the position and posture or point of view of the user used for generating the frame and the timestamp indicating when the state has been established. Alternatively, the server 400 may transmit, together with the frame data, only the timestamp indicating when the position and posture or point of view of the user used for generating the frame has been established. In this case, the image processing unit 244 of the image processing device 200*a*, 200*b*, 200*c*, or 200*d* acquires data corresponding to the transmitted timestamp from a position and posture or point of view history held in itself.

Further, the server 400 may transmit the field of view reference point used for generating the frame together with the frame data. Note that the image processing devices 200*a* to 200*d* each may transmit, to the server 400, the history of a data set including the position and posture or point of view of the user and a timestamp indicating when the state has been established together with the latest data set. Further, the server 400 may transmit, to the image processing device 200, the history of a data set including virtual point of view information used for generating a frame, a timestamp, and the like together with the latest data set and the frame data. Sending and receiving the past history in this way makes it possible to prepare for transmission failures.

Note that the image generating unit 420 of the server 400 may determine, to increase the display quality of the one or a plurality of image processing devices 200, a correspondence relation between the "drawing orientation" of a wide field-of-view image, that is, the position coordinates on the image plane and the directions in a world to be displayed. In the case of equirectangular projection, a "drawing orientation" is the orientation of a cylinder (the orientations of the longitude and latitude lines and a position at the standard parallel, that is, "0 degrees latitude") and a position at the left edge of the screen (position of 0 degrees longitude).

To achieve an increase in image quality, at least any of the following conditions is desirably satisfied.

1. In the image processing device 200, the degree of distortion correction that is performed after a region corresponding to the predicted position and posture of the head of the user has been cropped is small 2. In the image processing device 200, the resolution of an image in a region corresponding to the predicted position and posture of the head of the user is high Item 1 described above is set because, in a case where a wide field-of-view image is an image having the orientations as its axes, such as an image in equirectangular projection, or an image having lens distortion due to a fisheye lens or the like, the amount of distortion is different depending on positions on the image. Item 2 described above is set because, in the case of such an image, the resolution of display (the number of pixels in units of an area) is different depending on positions on the image. For example, in the case of equirectangular projection, since the amount of distortion is large at the upper edge and the lower edge, a "drawing orientation" is determined such that the upper edge and the lower edge of the wide field-of-view image are not included in a display field of view. Further, in a fisheye lens image, since the closer to the center, the smaller the amount of distortion and the higher the resolution, a "drawing orientation" is determined such that the upper edge, the lower edge, the left edge, and the right edge of the wide field-of-view image are not included in a display field of view.

Also in this case, the server 400 acquires the position and posture or point of view of the user together with a timestamp indicating the time point at which the state has been established from the image processing device 200, to identify the display field of view of each of the image processing devices 200. Further, the server 400 may predict the movement of the display field of view of the image processing device 200 and determine a "drawing orientation" on the basis of the movement. In this case, the server 400 holds the history of (a) a time required for the processing of the image generating unit 420, the history of (b) a network delay acquired from the communication unit 426 in the past, the history of (c) processing delays in the decoding/decompression unit 242 and the image processing unit 244 of the image processing device 200, and the history of the position and posture or point of view of the user.

Then, the image generating unit 420 predicts, by using those pieces of information in whole or part, a total delay time t=(a)+(b)+(c) required for a frame to be drawn to be displayed through the image processing device 200 and determines a "drawing orientation" suitable for a display field of view after the total delay time t has elapsed. The total delay time t may be predicted by using, for example, any of statistical values such as an average delay value, a frequently appearing delay value, and a delay value obtained by adding the differential (A value) of a change amount in the most recent delay history to the last delay. Then, the image generating unit 420 determines a "drawing orientation" such that, for example, a field of view obtained as a result of adding, to the last position and posture or point of view, the differential (A value) of the most recent change amount in the history of the position and posture or point of view of the user, that is, the motion vector, is not located on the edges of a wide field-of-view image in equirectangular projection or the like.

Moreover, the image generating unit 420 of the server 400 may predict the total delay time t in the similar manner described above and determine the content of an image to be represented as a frame on the assumption that the image is displayed after the total delay time t has elapsed. For example, in a case where the predicted value of the total delay time t is 5 ms, as the content of an image, a world after 5 ms has elapsed is drawn. In a case where the plurality of image processing devices 200 serve as data transfer destinations, the shortest one of the total delay times t predicted for the respective image processing devices is employed.

The server 400 transmits, to the image processing device 200, information regarding the "drawing orientation" employed in generating the frame of the wide field-of-view image together with the frame data. As described above, the image processing device 200 acquires the information regarding the "drawing orientation" together with the image data and the data set including the position and posture or point of view of the user and the timestamp indicating when the state has been established. With this, the image processing unit 244 of the image processing device 200 can crop an image at an appropriate position by using the transmitted information.

In conclusion of the above description, for example, in a case where a wide field-of-view image is generated in equirectangular projection, the image generating unit 420 of the server 400 predicts a change in position and posture or point of view of each user on the basis of a past motion vector and determines a "drawing orientation" such that a display field of view based on the prediction is not located on the edges of the wide field-of-view image. Further, the image generating unit 420 may generate an image in a range less than 360° obtained by extending the field of view based on the predicted position and posture or point of view by a predetermined range.

In any case, in this aspect, the image processing device 200 transmits, to the server 400, a data set including the position and posture or point of view of the user and a timestamp indicating the time point at which the state has been established, the history thereof, (b) a delay time due to internal processing, for example, the processing of the decoding/decompression unit 242 or the image processing unit 244, and the history thereof. The server 400 transmits, to the image processing device 200, the "drawing orientation" of a frame, the history thereof, the employed position and posture or point of view of the user, and a timestamp indicating the time point at which the state has been established, or a field of view reference point and the history thereof in association with data on a frame of a wide field-of-view image. Sending and receiving the past history in this way makes it possible to prepare for transmission failures.

Figure 9:
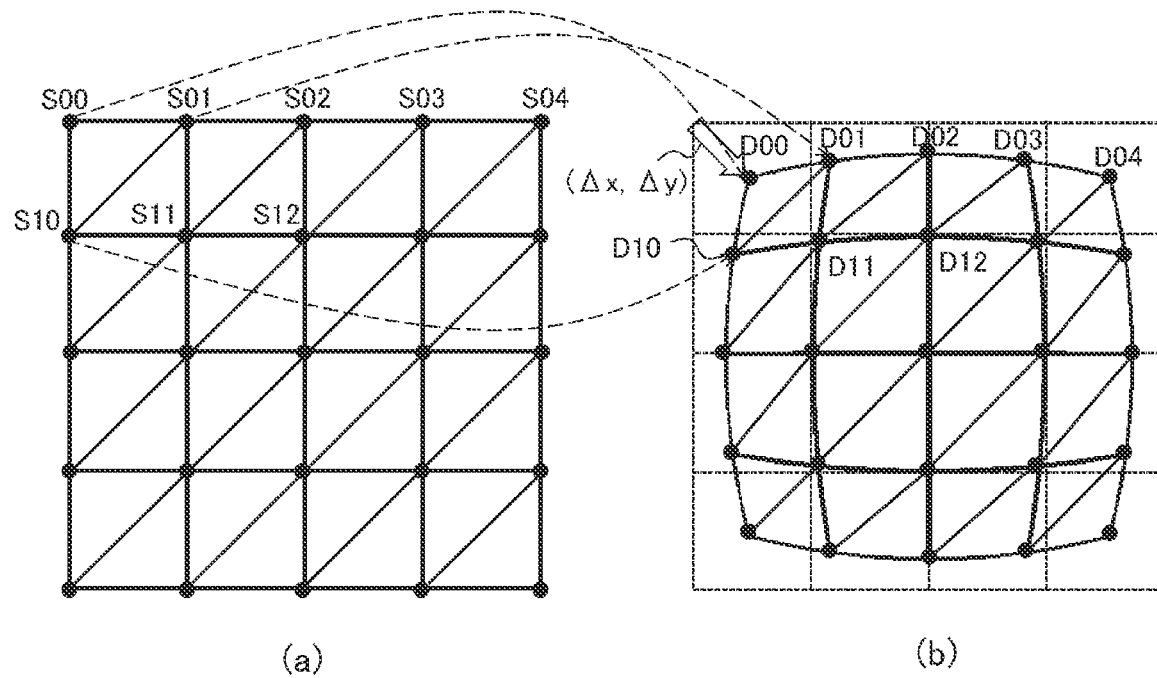
FIG. 9 depicts diagrams illustrating an exemplary image acquisition procedure that an image acquiring unit of the first forming unit performs in the image processing device of the present embodiment.

FIG. 9 depicts diagrams illustrating an exemplary image acquisition procedure that the image acquiring unit 264 of the first forming unit 270a performs in the image processing device 200. Here, (a) illustrates a portion of the plane of a wide field-of-view image transmitted from the server 400, and (b) illustrates the plane of an orthographic image cropped from the wide field-of-view image. However, the actual displacement of pixels is not limited to the one illustrated in FIG. 9. S00, S01, S02, etc., on the plane of the wide field-of-view image indicate positions at which displacement vectors are set on a displacement vector map. For example, the displacement vectors are set discretely in the horizontal and vertical directions of the image plane (for example, at even intervals such as every 8 pixels or 16 pixels).

D00, D01, D02, etc., on the cropped image plane indicate the positions of the respective displacement destinations of S00, S01, S02, etc. In FIG. 9, as an example, a displacement vector from S00 to D00 ($\Delta x, \Delta y$) is indicated by the outline arrow. The image acquiring unit 264 maps a region in a field of view of a wide field-of-view image to a cropped image in units of the smallest triangle with vertices being pixels to which displacement vectors are set. For example, a triangle having S00, S01, and S10 as its vertices of the pre-crop image is mapped to a triangle having D00, D01, and D10 as its vertices of the cropped image.

Here, the pixels inside the triangle are displaced linearly depending on the distances to D00, D01, and D10 or displaced to positions obtained by bilinear or trilinear interpolation or the like. Then, the image acquiring unit 264 reads the values of the pixels corresponding to the pre-crop partial image, which have been stored in the connected local memory, to determine the pixel values in the cropped image. On this occasion, the values of a plurality of pixels inside a predetermined range from the position of a reading out destination in the pre-crop image are obtained by bilinear or trilinear interpolation or the like, thereby deriving the pixel values in the cropped image.

With this, the image acquiring unit 264 can draw a cropped image in the order of pixel rows in units of a triangle that is the displacement destination of the triangle of the pre-crop image. Note that the image acquiring unit 264 may update, to implement cropping reflecting a predicted position and posture value in real time, a displacement vector map in units of a region corresponding to a partial image.

Figure 10:
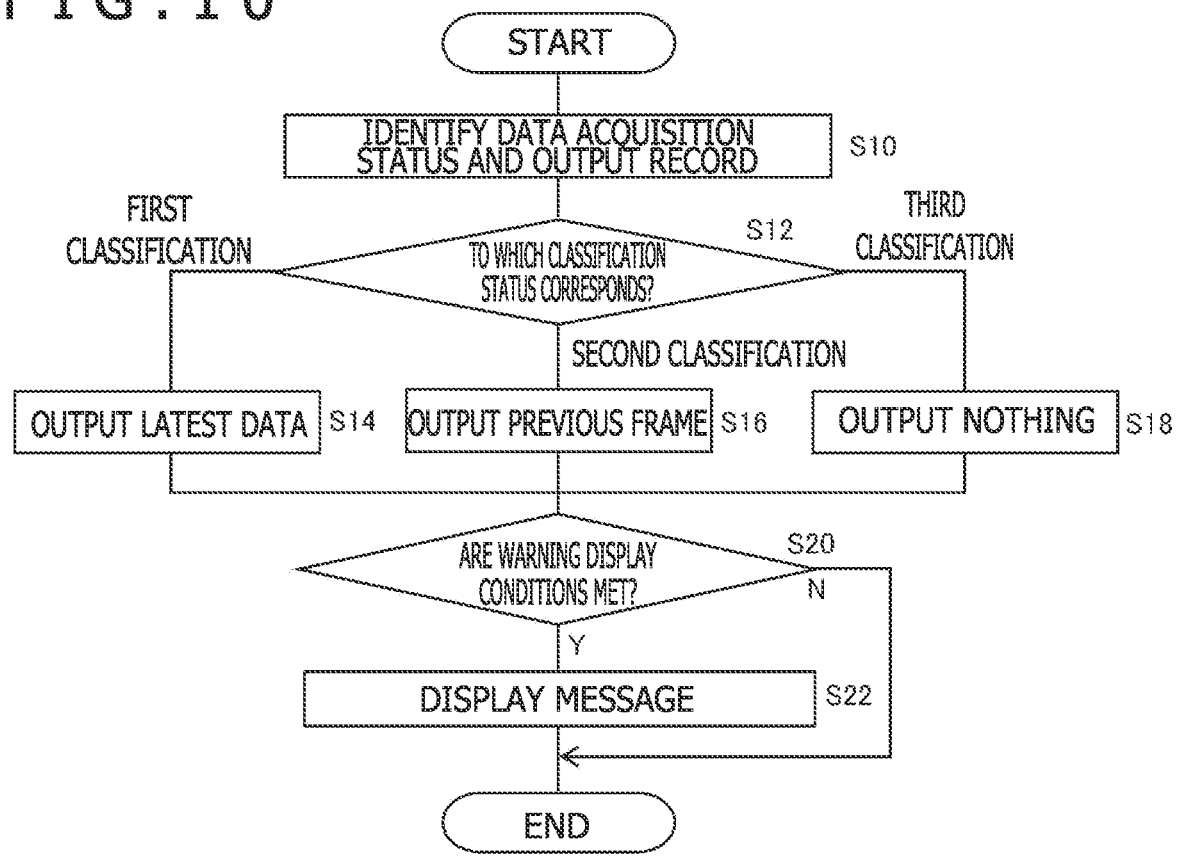
FIG. 10 is a flowchart illustrating an exemplary processing procedure in which the first control unit of the display control unit outputs, while adjusting an output object and output timing, partial image data to a display panel in the present embodiment.

FIG. 10 is a flowchart illustrating an exemplary processing procedure in which the first control unit 272a of the display control unit 246 outputs, while adjusting an output object and output timing, partial image data to the display panel in the present embodiment. This flowchart illustrates the procedure of processing that is carried out on a frame to be started to be displayed in synchronization with a vertical synchronization signal of the display panel at a predetermined timing prior to the timing of the vertical synchronization signal. That is, the processing illustrated in FIG. 10 is repeated on a frame-by-frame basis. Note that the second control unit 272b may carry out the same processing procedure.

First, the data acquisition status identifying unit 248 identifies the acquisition status of partial images included in a target frame (S10). The data acquisition status identifying unit 248 may further record the output record of partial images in the past frames and refer to the output record. Here, an output record includes at least any of the following data, for example.

1. The history of a classification selected in a past predetermined period from three classifications described later
2. The history, occurrence rate, and area ratio of a missing partial image in a first classification, which is described later, in a past predetermined period
3. An elapsed time from the last update of a display image Then, the output object determining unit 250 determines to which classification prepared in advance the identified status corresponds (S12). The output object determining unit 250 basically makes a comprehensive determination from various perspectives to determine an output object that provides the best user experience. Thus, the data acquisition status identifying unit 248 acquires at least any of the following parameters in S10.

1. The quantity of acquired partial images of partial images in a target frame
2. The range of a missing partial image in a target frame
3. The display duration of the same image frame
4. The duration of blackout described later
5. An elapsed time from the generation time point of a partial image One or a plurality of thresholds are set to each parameter described above.

Then, the output object determining unit 250 gives a score on the basis of to which range the acquired parameters regarding the target frame correspond, for example, to thereby classify the status. For example, the output object determining unit 250 gives a score to each parameter acquired in S10 on the basis of a table defined in advance and classifies the status on the basis of the distribution of the scores of all the parameters. In the example illustrated in FIG. 10, three classifications are prepared. In a case where the status corresponds to the first classification, the output object determining unit 250 determines, as an output object, the latest one of pieces of partial image data obtained by then and causes the output unit 254 to output the data (S14).

For example, in a case where the ratio of acquired partial images in the target frame is equal to or more than a predetermined value and elapsed times from the generation time points of the partial images are within an acceptable range, the output object determining unit 250 classifies, on the basis of a score determination, the target frame into the first classification. At this time, the output object determining unit 250 makes a timing adjustment such that the partial images are output in an order corresponding to the respective generation time points. Ideally, the partial images are sequentially output from the partial images in the upper section of the frame.

However, in a case where some of the partial images are missing, the output object determining unit 250 may further score the following parameters of each missing portion and determine whether to reuse a partial image at the same position in the previous frame or cause blackout in that portion.

1. The display duration of the same image frame
2. The duration of blackout described later
3. An elapsed time from the generation time point of a partial image Note that, in a case where an original image has not been able to be displayed for a predetermined period of time or more until then, the output object determining unit 250 may classify the target frame into the first classification even when the ratio of acquired partial images in the target frame is not equal to or more than the predetermined value. The table for score determination described above may be set to achieve this. With this, the motion of an image can be represented to the extent possible even just in part. Note that the image processing unit 244 may presume and restore missing images.

In a case where the status corresponds to the second classification, the output object determining unit 250 determines, as an output object, data on an image in the frame prior to the target frame and causes the output unit 254 to output the data (S16). In this case, the same frame is continuously displayed on the display panel. For example, in a case where the ratio of acquired partial images in the target frame is not equal to or more than the predetermined value and the ratio of acquired partial images in a frame in the previous predetermined period of time is equal to or more than the predetermined value, the output object determining unit 250 classifies the target frame into the second classification. The table for score determination described above may be set to achieve this.

In a case where the status corresponds to the third classification, the output object determining unit 250 determines to output nothing in the period in which the target frame data is to be output (S18). In this case, the display panel is blackout for a period corresponding to one frame. For example, in a case where the ratio of acquired partial images in the target frame is not equal to or more than the predetermined value and an elapsed time from the generation time point of the image being displayed is too long to continuously display the image, the output object determining unit 250 classifies the target frame into the third classification. The table for score determination described above may be set to achieve this. Note that, during blackout, a solid black image is basically displayed, but another color set in advance may be used.

When a frame corresponding to the second classification or the third classification has been continuously displayed for a predetermined period of time, as described above, a frame may be classified into the first classification regardless of the acquisition status of partial images, to thereby make some image update even just in part. Note that user experience tends to be degraded from the first classification to the third classification. Thus, the table for each parameter acquired in S10 is determined to give a high score when a satisfactory user experience is required.

Then, in S12, with respect to the parameters obtained in S10, scores are given on the basis of the tables, and the thus obtained plurality of scores are added up. Depending on how large the total value is, one of the display method classifications including the first to third classifications is selected. Here, thresholds are determined in advance such that a larger total value corresponds to the first classification and a smaller total value corresponds to the third classification.

Note that the example illustrated in FIG. 10 is merely an aspect, and the types of information that the data acquisition status identifying unit 248 acquires, the determination criteria for classification by the output object determining unit 250, and an output object in each classification are appropriately determined on the basis of the content of a moving image serving as a display object, an acceptable degree of missing, an acceptable missing duration, an acceptable display delay, an acceptable display stop time, or the like. Further, the first control unit 272a may hold, in a memory, which is not illustrated, or the like, images, displayed images in a certain range, generation time points, or determination results or scores in S10 or S12 accumulated in a wait time to the next vertical synchronization signal.

Moreover, the output object determining unit 250 determines, in addition to the determination in S12, whether the status regarding the target frame meets user warning conditions or not (S20). For example, the output object determining unit 250 determines that a warning to the user is required when a condition that the time of blackout per unit time or the quantity of missing partial images is more than a threshold is met (Y in S20). At this time, the output object determining unit 250 displays a message indicating that the communication status affects the image display (S22).

The message may be superimposed on the partial images by the image processing unit 244 to be displayed. With this, the user can grasp the cause of the defects of the displayed image. In a case where the warning conditions are not met, the message is not displayed (N in S20). Through the procedures described above, the processing relating to the target frame ends, and processing relating to the next frame starts.

Note that the data acquisition status identifying unit 248 may derive a tendency of data transmission delay time on the basis of elapsed times from the generation time points of the partial images acquired in S10 to the time of processing. For example, the data acquisition status identifying unit 248 generates a histogram of elapsed times from the generation time points of a predetermined number of partial images acquired in the past. Then, the data acquisition status identifying unit 248 detects a tendency of an increase in elapsed time when the histogram is biased toward a longer elapsed time by a reference value or more, for example.

At this time, the data acquisition status identifying unit 248 may send the server 400 through the image data acquiring unit 240 or the like a request for a reduction in size of image data to be transmitted. For example, the data acquisition status identifying unit 248 requests to skip the data transmission of an image for one frame or requests to increase the compression ratio by a predetermined amount. The data acquisition status identifying unit 248 may request to reduce the screen resolution by a predetermined amount. Alternatively, the data acquisition status identifying unit 248 may request the output object determining unit 250 to skip the output of data on an image for one frame.

Alternatively, the data acquisition status identifying unit 248 may transmit, to the server 400, elapsed times from the generation time points of partial images to the acquisition thereof or the history thereof. The communication unit 426 of the server 400 may acquire the elapsed times or the history, and the compression/encoding unit 422 may generate a histogram, detect a tendency of an increase in elapsed time when the histogram is biased toward a longer elapsed time, and reduce the size of image data to be transmitted. Alternatively, the data acquisition status identifying unit 248 may notify the server 400 of how many times the first to third classifications described above have been determined. Those measures make it possible to prevent a remarkable delay in the display of subsequent frames or missing data due to an increase in delay time.

Figure 11:
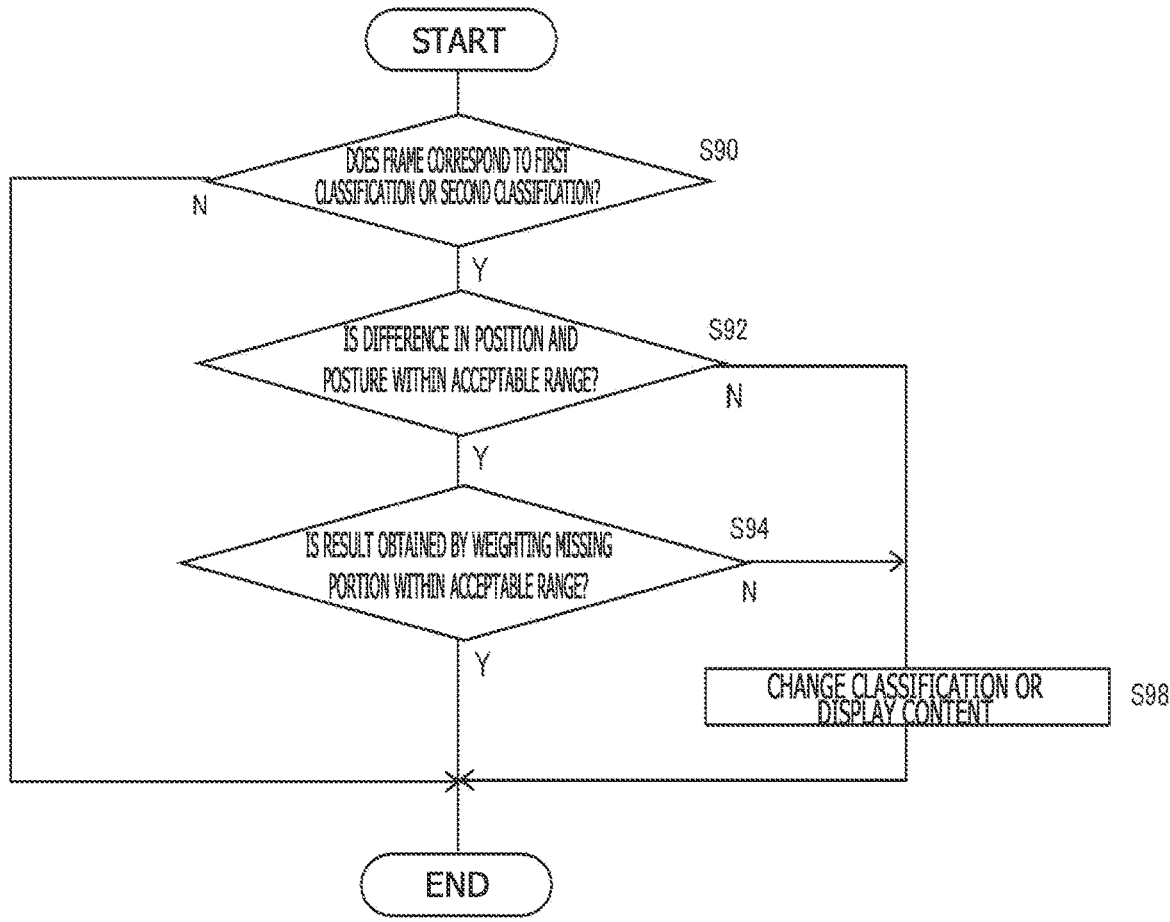
FIG. 11 is a flowchart illustrating a processing procedure in which the first control unit of the display control unit adjusts an output object on the basis of a change in position and posture of the head-mounted display in the present embodiment.

FIG. 11 is a flowchart illustrating a processing procedure in which the first control unit 272a of the display control unit 246 adjusts an output object on the basis of a change in position and posture of the head-mounted display 100 in the present embodiment. This flowchart is carried out after the determination processing in S12 of the flowchart of FIG. 10. More specifically, the output object determining unit 250 of the first control unit 272a makes an additional determination as needed to change a frame classified in the determination processing in S12 into the first classification or the second classification to the third classification.

Thus, in a case where it is determined from the acquisition status of partial images that the target frame corresponds to the third classification in S12 of FIG. 10, the output object determining unit 250 ends the processing straight away (N in S90). Meanwhile, in a case where it is determined that the target frame corresponds to the first classification or the second classification (Y in S90), the output object determining unit 250 first determines whether a difference between the position and posture of the head-mounted display 100 predicted when the first forming unit 270a has cropped the image and the latest position and posture is within an acceptable range or not (S92).

When a difference between a predicted value and an actual value in terms of position and posture is out of the acceptable range, data on the frame is not to be output to the display panel. That is, in a case where the difference is out of the acceptable range, the output object determining unit 250 changes the classification of the target frame determined as the first classification or the second classification to the third classification (N in S92 and S98). In this case, the display is blackout. Alternatively, in a case where the frame has been originally classified into the first classification, the first classification may be kept to prevent a past frame from being used for the display of the missing portion in S14 of FIG. 10.

A criterion for determining whether a difference in position and posture is within the acceptable range or not may be different between a case where the entire region of a frame can be covered by the latest partial images (first classification) and a case where partial images in a past frame are used even just in part (first classification or second classification). Specifically, the smaller the difference in position and posture, the more acceptable it may be to use partial images in a past frame. Whether a difference in position and posture is within the acceptable range or not may be determined from a magnitude relation with a threshold set to a difference in position and posture or comprehensively determined by giving, as a score value for acceptable range determination, a function that is lowered as a difference in position and posture is increased and adding up the function and a score value used for the determination in FIG. 10, for example.

When it is determined that the difference in position and posture is within the acceptable range (Y in S92), the output object determining unit 250 next determines whether the result of evaluating the degree of data missing in the target frame from the perspective of the point of view of the user is within an acceptable range or not (S94). Specifically, the output object determining unit 250 quantifies the degree of data missing by giving a larger weight to a portion closer to the point-of-gaze of the user and determines, in a case where the numerical value is larger than a threshold, that the degree of data missing is out of the acceptable range. In a case where the degree of missing is out of the acceptable range (N in S94), the output object determining unit 250 changes the target frame classified into the first classification to the second classification or the third classification.

Alternatively, the output object determining unit 250 changes the target frame classified into the second classification to the third classification (S98). With this, an adjustment is made to reuse a past frame or cause blackout without outputting the frame when more data is missing in a portion easily visible to the user. Note that the determination processing in S94 may be performed simultaneously with the determination processing in S12 of FIG. 10. When determining that the degree of data missing is within the acceptable range, the output object determining unit 250 keeps the original classification and ends the processing straight away (Y in S94). Note that the determinations in S92 and S94 are not necessarily performed independently of each other. Scores may be obtained on the basis of the respective determination criteria to be added up, thereby comprehensively and simultaneously making a classification and a determination on the necessity of display content change. As a result of the additional determinations as described above, any one of the processes in S14, S16, and S18 of FIG. 10 is carried out.

Figure 12:
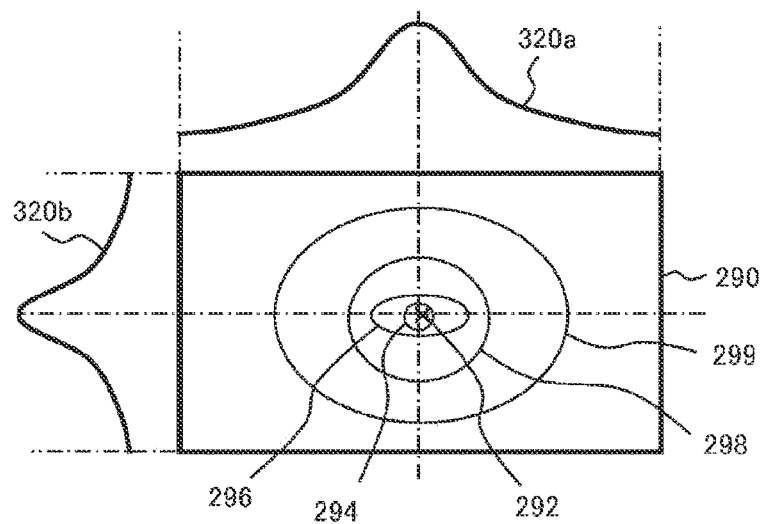
FIG. 12 is a diagram illustrating how an output object determining unit quantifies the degree of data missing on the basis of the point of view of a user in S94 of FIG. 11.

FIG. 12 is a diagram illustrating how the output object determining unit 250 quantifies the degree of data missing on the basis of the point of view of the user in S94 of FIG. 11. In this example, a point-of-gaze 292 of the user is located near the center of a display screen 290. Since the user wearing the head-mounted display 100 generally turns his/her face in the direction that he/she wants to see, the center of the display screen 290 can be regarded as the point-of-gaze 292.

As general human visual characteristics, a region 294 corresponding to a region within 5° from the central axis being the line of sight extending from the pupil toward the point-of-gaze is called "discriminative field of view" in which the visual function such as eyesight is excellent. Further, a region 296 corresponding to a region extending horizontally by approximately 30° and vertically by approximately 20° is called "effective field of view" in which instant information reception can be achieved only with eye movement. Moreover, a region 298 corresponding to a region extending horizontally by 60° to 90° and vertically by 45° to 70° is "stable field of fixation." A region 299 corresponding to a region extending horizontally by 100° to 200° and vertically by 85° to 130° is "auxiliary field of view." In this way, the farther from the point-of-gaze 292, the lower the information identification ability.

Accordingly, as illustrated in the upper and left parts of FIG. 12, on the plane of the display screen 290, weighting functions 320a and 320b that are increased as getting closer to the point-of-gaze 292 are set. Note that, in FIG. 12, the weighting functions 320a and 320b are illustrated as the functions with respect to one-dimensional positions in the horizontal and vertical directions on the plane of the display screen 290, but in actuality, are functions with respect to two-dimensional position coordinates on the plane or tables. For example, the output object determining unit 250 multiplies the area of each missing partial image by a weight based on the position coordinates of the missing portion and sums up the thus obtained values for the entire region of the target frame, thereby deriving the degree of missing as a numerical value.

With this, a higher degree of missing can be estimated for a missing region higher in visibility than others having the same missing area, so that it can be determined whether the degree of missing is within the acceptable range or not by taking into account how the image looks. Note that the shapes of the weighting functions 320a and 320b illustrated in FIG. 12 are merely exemplary, and the weighting functions 320a and 320b may have shapes optimized on the basis of the visual characteristics in each range described above or the like or may be discontinuous functions. Further, in a case where the head-mounted display 100 is provided with a point-of-gaze detector, the point-of-gaze 292 is more strictly obtained at a position that is not necessarily the center of the display screen 290.

In this case, it is sufficient that the output object determining unit 250 moves the positions at which the weighting functions 320a and 320b are maximum along with the movement of the point-of-gaze 292. Further, in a case where the point-of-gaze detector is used, since point-of-gaze information can be more strictly acquired, a change in weight relative to a distance may be increased as compared to the case where the center of the screen is regarded as a point-of-gaze, thereby amplifying the effect on the degree of missing. Moreover, the output object determining unit 250 may identify, on the basis of a difference between the predicted value of the position and posture of the head-mounted display 100 and actual position and posture at the time of processing, a region that is expected to be located outside the display field of view of a region cropped by the first forming unit 270a and exclude the region from the degree of missing evaluation target.

FIG. 13 is a flowchart illustrating the procedures of processing that the first forming unit 270a of the image processing unit 244 and the first control unit 272a of the display control unit 246 carry out in the image processing device 200. This flowchart is basically performed in units of a frame of a moving image. First, the first control unit 272a acquires the latest position and posture of the head-mounted display 100 by the position and posture tracking unit 252 and supplies the position and posture to the first forming unit 270a (S100).

Further, the first control unit 272a supplies, to the first forming unit 270a, the following histories obtained for past frames: the history of a delay time from the time point of cropping in the first forming unit 270a to the processing of the first control unit 272a and the history of a difference between a predicted value and an actual value in terms of the position and posture of the head-mounted display 100 (S102). Note that the transmission processing in S100 and S102 may be performed at any timing not synchronized with frames. Further, in S102, the history of a predetermined number of past frames can be transmitted to prepare for transmission failures.

The position and posture predicting unit 262 of the first forming unit 270a predicts, on the basis of those pieces of information, the position and posture of the head-mounted display 100 in displaying the frame (S104). That is, the position and posture predicting unit 262 predicts, by using various types of information supplied from the first control unit 272a, position and posture after a time required for the following processing of the first forming unit 270a, the processing of the first control unit 272a, and output has elapsed. Next, the image acquiring unit 264 of the first forming unit 270a crops a region corresponding to the predicted position and posture from a wide field-of-view image transmitted from the server 400 (S106).

On this occasion, the image acquiring unit 264 may crop a field of view with a range extended by a predetermined amount defined in advance to prevent display defects. Further, the image acquiring unit 264 may perform necessary correction by using a displacement vector map as described above. The image acquiring unit 264 supplies data on the cropped image subjected to various types of correction, the cropping time point thereof, and the predicted position and posture value used for cropping to the first control unit 272a in association with each other (S108). The image acquiring unit 264 further supplies, to the first control unit 272a, the history of a cropping time point and the history of a predicted position and posture value in terms of a predetermined number of processed images to prepare for transmission failures of those pieces of information.

When the data acquisition status identifying unit 248 of the first control unit 272a acquires those pieces of data, the output object determining unit 250 acquires a delay time from partial image cropping and a difference between the predicted value and the actual value in terms of position and posture (S110). Then, the output object determining unit 250 classifies the frame on the basis of those pieces of data, for example, to thereby control an output object (S112). Except for the case where the third classification is determined and blackout is caused, the output object determining unit 250 determines the current frame cropped by the first forming unit 270a or the previous frame as an output object, and the output unit 254 outputs the frame to the display panel (S114).

Note that, in a case where the previous frame is determined as an output object, the first control unit 272a may request the first forming unit 270a to crop a region corresponding to the latest position and posture of the head-mounted display 100 from a wide field-of-view image in the previous frame and determine the thus cropped image as an output object. Further, in a case where attention is paid to the configuration in which the server 400 transmits a wide field-of-view image so that an image corresponding to the latest position and posture is generated without any problem and that the image is efficiently delivered to a plurality of users, the configuration effectively functions also when each process is executed in units of a frame instead of in units of a partial image.

According to the present embodiment described above, in the system in the form in which the image processing device 200, which corresponds to a client, receives, and displays image data generated by the server 400, the server 400 generates and transmits an image in a field of view wider than the display field of view on the client side. For example, the server 400 transmits a wide field-of-view moving image in equirectangular projection to make it possible to display the image without any problem regardless of the field of view on the client side.

In particular, in display using a head-mounted display, an image having a small delay from the motion of the head of a user can continuously be displayed. Further, even with the uniform processing of the server 400, independent images can easily be displayed on display devices having various display formats or screen aspect ratios, so that the processing load on the server 400 can be reduced in an aspect in which a plurality of users face any direction in the same image world. Moreover, since the server 400 can perform multicast or broadcast delivery, the utilization efficiency of the network bandwidth can be enhanced. As a result, even in a form in which a moving image is delivered from a server, a high-quality image can be displayed with a low delay.

The present invention has been described above on the basis of the embodiment. The embodiment is exemplary, and it is to be understood by those skilled in the art that the combinations of the components and the processes of the embodiment can variously be modified and that such modifications are also included in the scope of the present invention.

INDUSTRIAL APPLICABILITY

As described above, the present invention can be utilized for various information processing devices such as servers, image display devices, game consoles, mobile terminals, and personal computers and image display systems including any of them, for example.

REFERENCE SIGNS LIST

1: Image display system
100: Head-mounted display
200: Image processing device
240: Image data acquiring unit
242: Decoding/decompression unit
244: Image processing unit
246: Display control unit
248: Data acquisition status identifying unit
250: Output object determining unit
252: Position and posture tracking unit
254: Output unit
262: Position and posture predicting unit
264: Image acquiring unit
270a: First forming unit
272a: First control unit
273: Client information transmitting unit
302: Flat panel display
400: Server
420: Image generating unit
422: Compression/encoding unit
424: Packetizing unit
426: Communication unit

The invention claimed is:
1. An image display system, comprising:
an image data transferring device configured to transfer data on a moving image; and
a client terminal configured to receive the data on the moving image and cause a display device to display the moving image, wherein
the image data transferring device includes
an image generating unit configured to generate a frame of the moving image depicting a world serving as a display object in a field of view wider than a display field of view of a transfer destination, and
a communication unit configured to transfer data on the frame to the client terminal by streaming, and
the client terminal includes
an image data acquiring unit configured to acquire the data on the frame,
an image processing unit configured to crop a region in the display field of view from the frame, and
a display control unit configured to output data on the region cropped to a display panel, wherein the display control unit quantifies a degree of missing of the data on the frame by giving a larger weight to a missing position with a smaller distance to a point-of-gaze of the user on a display screen and changes data on an output object depending on the quantification.

2. The image display system according to claim 1, wherein the image generating unit dynamically generates a frame of a moving image to be transferred that has not existed so far.

3. The image display system according to claim 1, wherein
the communication unit acquires information regarding user operation on the client terminal, and
the image generating unit changes content to be depicted in the frame in response to the user operation.

4. The image display system according to claim 3, wherein
the client terminal includes a client information transmitting unit configured to acquire information regarding user operation different from field of view-related operation for a display image and transmit the information to the image data transferring device, and
the image generating unit changes the content to be depicted in the frame in response to the user operation different from the field of view-related operation.

5. The image display system according to claim 1, wherein
the image generating unit generates the frame in equirectangular projection, and
the image processing unit corrects an image cropped to a format compatible with the display panel.

6. The image display system according to claim 5, wherein the image processing unit determines the region to be cropped from the frame on a basis of position and posture of a head-mounted display including the display panel.

7. The image display system according to claim 1, wherein
the image generating unit generates the frame in a field of view covering a displayable orientation, and
the communication unit transfers the data on the frame to a plurality of the client terminals in common.

8. The image display system according to claim 1, wherein the image generating unit determines, on a basis of a display field of view of each of a plurality of the client terminals and image quality, a correspondence relation between position coordinates on an image plane of the frame to be generated and a direction in the world to be displayed.

9. The image display system according to claim 8, wherein the image generating unit determines the correspondence relation on a basis of a prediction of movement of the display field of view of each of the plurality of the client terminals.

10. The image display system according to claim 9, wherein the image generating unit generates a frame of an image in a range less than 360° obtained by extending a field of view predicted in each of the plurality of the client terminals by a predetermined range.

11. The image display system according to claim 8, wherein
the client terminal transmits, to the image data transferring device, a data set including position and posture of a user or a point of view of the user and a timestamp indicating a time point at which the position and posture of the user or the point of view of the user has been established, a history thereof, a delay time due to internal processing, and a history thereof, and
the image data transferring device transmits position and posture of the user or a point of view of the user employed in generating the frame and a timestamp indicating a time point at which the position and posture of the user or the point of view of the user has been established, or a position at which an origin in a three-dimensional space of the display object is located in the frame and a history thereof, and the correspondence relation determined and a history thereof to the client terminal in association with the data on the frame.

12. The image display system according to claim 1, wherein the image generating unit predicts a time required for the frame to be generated to be displayed on the client terminal and determines content of an image to be depicted in the frame on an assumption that the image is displayed after the time predicted has elapsed.

13. The image display system according to claim 1, wherein
the communication unit transfers the data in common on the frame to a plurality of the client terminals configured to implement different display formats, and
the image processing unit of each of the plurality of the client terminals forms, from the data on the frame, an image compatible with a corresponding one of the display formats implemented.

14. The image display system according to claim 1, wherein
the image data acquiring unit acquires the data on the frame in units of a partial image smaller than one frame, and
the image processing unit crops the region in units of the partial image.

15. The image display system according to claim 1, wherein the image processing unit predicts position and posture of a head-mounted display including the display panel in displaying a target frame and crops a region corresponding to a predicted value of the position and posture from the frame.

16. The image display system according to claim 15, wherein the display control unit changes data on an output object depending on a difference between the predicted value used for the cropping and the position and posture of the head-mounted display at a time of processing.

17. The image display system according to claim 16, wherein the image processing unit supplies a history of the predicted value used for the cropping to the display control unit together with data cropped.

18. The image display system according to claim 15, wherein the display control unit changes data on an output object depending on a delay time from a time point at which the frame has been generated in the image data transferring device.

19. The image display system according to claim 15, wherein the display control unit determines whether to output data on a latest frame or data on a previous frame to the display panel on a frame-by-frame basis.

20. The image display system according to claim 15, wherein the display control unit supplies, to the image processing unit, a history of a difference between the predicted value and the position and posture of the head-mounted display at a time of processing and a history of a delay time from a cropping time point of the region to the time of processing.

21. The image display system according to claim 1, wherein the display control unit changes a change in the weight relative to the distance depending on whether information regarding the point-of-gaze of the user on the display screen is acquirable by a point-of-gaze detector or not.

22. The image display system according to claim 1, wherein the display control unit identifies, on a basis of a difference between the predicted value used for the cropping and the position and posture of the head-mounted display at a time of processing, a region that is expected to be located outside the display field of view of the region cropped and evaluates the degree of missing of the data while excluding the region.

23. An image display method for an image display system,
the image display system including
an image data transferring device configured to transfer data on a moving image, and
a client terminal configured to receive the data on the moving image and cause a display device to display the moving image,
the image display method comprising:
generating, by the image data transferring device, a frame of the moving image depicting a world serving as a display object in a field of view wider than a display field of view of a transfer destination;
transferring, by the image data transferring device, data on the frame to the client terminal by streaming;
acquiring, by the client terminal, the data on the frame;
cropping, by the client terminal, a region in the display field of view from the frame; and
outputting, by the client terminal, data on the region cropped to a display panel, wherein the outputting includes quantifying a degree of missing of the data on the frame by giving a larger weight to a missing position with a smaller distance to a point-of-gaze of the user on a display screen and changes data on an output object depending on the quantification.

24. The image display method according to claim 23, wherein the generating a frame includes dynamically generating a frame of a moving image to be transferred that has not existed so far.

25. A non-transitory, computer readable storage medium containing a computer program, which when executed by a computer, causes the computer to perform an image display method for an image display system, the image display system including:
an image data transferring device configured to transfer data on a moving image, and
a client terminal configured to receive the data on the moving image and cause a display device to display the moving image,
the image display method comprising:
generating, by the image data transferring device, a frame of the moving image depicting a world serving as a display object in a field of view wider than a display field of view of a transfer destination;
transferring, by the image data transferring device, data on the frame to the client terminal by streaming;
acquiring, by the client terminal, the data on the frame;
cropping, by the client terminal, a region in the display field of view from the frame; and
outputting, by the client terminal, data on the region cropped to a display panel, wherein the outputting includes quantifying a degree of missing of the data on the frame by giving a larger weight to a missing position with a smaller distance to a point-of-gaze of the user on a display screen and changes data on an output object depending on the quantification.

26. The computer program according to claim 25, wherein the acquiring includes acquiring data on a frame of a moving image that has not existed so far and has been dynamically generated.

* * * * *